United States Patent
Wen et al.

(10) Patent No.: US 12,409,519 B1
(45) Date of Patent: Sep. 9, 2025

(54) INTELLIGENT MACHINING LINE FOR PIPE SECTIONS AND METHOD FOR MACHINING SAME

(71) Applicants: CHINA CONSTRUCTION THIRD ENGINEERING BUREAU GROUP CO., LTD, Hubei (CN); CHINA CONSTRUCTION THIRD BUREAU FIRST ENGINEERING CO., LTD., Hubei (CN); CHINA CONSTRUCTION THIRD BUREAU FIRST ENGINEERING & MEP CO., LTD., Guangdong (CN)

(72) Inventors: Jiangtao Wen, Hubei (CN); Yong He, Hubei (CN); Min Wei, Hubei (CN); Bo Liu, Hubei (CN); Pengfei Dang, Hubei (CN); Zhiheng Zhang, Hubei (CN); Hongbin Li, Hubei (CN); Jinyou Huang, Hubei (CN); Yicai Zhang, Hubei (CN)

(73) Assignees: CHINA CONSTRUCTION THIRD ENGINEERING BUREAU GROUP CO., LTD, Wuhan (CN); CHINA CONSTRUCTION THIRD BUREAU FIRST ENGINEERING CO., LTD., Wuhan (CN); CHINA CONSTRUCTION THIRD BUREAU FIRST ENGINEERING & MEP CO., LTD., Shenzhen (CN)

( * ) Notice: Subject to any disclaimer, the term of this patent is extended or adjusted under 35 U.S.C. 154(b) by 0 days.

(21) Appl. No.: 19/030,934

(22) Filed: Jan. 17, 2025

(30) Foreign Application Priority Data

Mar. 8, 2024 (CN) .......................... 202410265778.9

(51) Int. Cl.
*B23P 21/00* (2006.01)
*B23P 23/06* (2006.01)
*F16L 13/02* (2006.01)

(52) U.S. Cl.
CPC ............. *B23P 21/004* (2013.01); *B23P 23/06* (2013.01); *F16L 13/02* (2013.01)

(58) Field of Classification Search
CPC ............. Y10T 29/5185; Y10T 29/5199; Y10T 29/5367; Y10T 29/49829; Y10T 29/5124;
(Continued)

(56) References Cited

U.S. PATENT DOCUMENTS

| | | | |
|---|---|---|---|
| 6,237,204 B1 | 5/2001 | Hoglund et al. | |
| 2023/0405743 A1* | 12/2023 | Kang | B23P 23/06 |

FOREIGN PATENT DOCUMENTS

| | | |
|---|---|---|
| CN | 202015947 U | 10/2011 |
| CN | 104384935 A | 3/2015 |

(Continued)

OTHER PUBLICATIONS

Notification to Grant Patent Right for Invention, Chinese Application No. 202410265778.9, mailed Jul. 23, 2024 (3 pages).
(Continued)

*Primary Examiner* — Matthew P Travers
(74) *Attorney, Agent, or Firm* — HOWARD M COHN and Associates, LLC

(57) ABSTRACT

Disclosed are an intelligent machining line for pipe sections and a method for machining same. The intelligent machining line for pipe sections includes: a cutting station, an assembly station, a finished product station, and a derusting station. The cutting station includes a first material conveying module, a clamping module and a cutting module. The assembly station includes a support module, a welding module, a first fitting storage module and a first transfer module. The finished product station includes a second transfer module and a finished product storage module. The first transfer module includes a driving structure and a grabbing assembly. The grabbing assembly is configured to grab a pipe section to be machined, a fitting or an assembled pipe section, and the driving structure is configured to drive the (Continued)

grabbing assembly to move among the assembly station, the cutting station and the finished product station.

5 Claims, 19 Drawing Sheets

(58) Field of Classification Search
CPC ............ Y10T 29/5145; Y10T 29/5191; Y10T 29/5196; B23P 19/04; B23P 21/004; B23P 23/06; B21D 45/00; B21D 13/02
See application file for complete search history.

(56) References Cited

FOREIGN PATENT DOCUMENTS

| CN | 109290808 A | * | 2/2019 | ............ B23P 15/00 |
|---|---|---|---|---|
| CN | 211564673 U | | 9/2020 | |
| CN | 215356796 U | | 12/2021 | |
| CN | 217513071 U | | 9/2022 | |
| CN | 116060540 A | | 5/2023 | |
| DE | 4020924 C1 | | 7/1991 | |
| EP | 4212316 A1 | | 7/2023 | |

OTHER PUBLICATIONS

Weimin Long; "China Strategic Emerging Industries Research and Development: Welding Materials and Equipment", Mechanical Industry Press, pp. 317-320, date of issue Dec. 31, 2020.

Hairen Liu et al.; Marine Electric & Electronic Engineering, "Study on Intelligent Length Measurement and Fixed Length CuttingUnit for Ship Pipe Processing", pp. 1-4 and 10, vol. 40, No. 08, date of issue Aug. 15, 2020.

Bowen Sun; Ship Standardization Engineer, "Research on Pipeline Prefabrication Production Line", pp. 51-65, date of issue Mar. 15, 2020.

* cited by examiner

INTELLIGENT MACHINING LINE FOR PIPE SECTIONS AND METHOD FOR MACHINING SAME

FIELD

The disclosure relates to the technical field of machining apparatuses, in particular to an intelligent machining line for pipe sections and a method for machining same.

BACKGROUND OF THE INVENTION

Pipe sections used in architecture and engineering are formed by welding various portions. In a process of machining the pipe sections, long pipes are cut and derusted (in random order), cut portions serve as main pipe sections, then fittings such as flanges, branch pipes and elbow pipes are welded to the main pipe sections, and the pipe sections used in the architecture and engineering are formed accordingly.

In a process of machining existing pipe sections, cutting, welding and derusting (in random order) are separate procedures, and are most performed manually on construction sites or engineering sites. But manual operation of cutting, derusting and welding is inefficient, especially when fittings including large flanges and branch pipes are attached and welded to the main pipe sections. In consequence, the output falls far short of the actual demand, and labor-intensive work is needed, resulting in waste.

BRIEF DESCRIPTION OF DRAWINGS

To describe technical solutions in examples of the disclosure or in the prior art more clearly, accompanying drawings required in description of the examples or in the prior art will be briefly introduced below. Apparently, the accompanying drawings in the following description merely show some examples of the disclosure, and a person of ordinary skill in the art can still derive other accompanying drawings from structures shown in these accompanying drawings without creative efforts.

Figure 1:
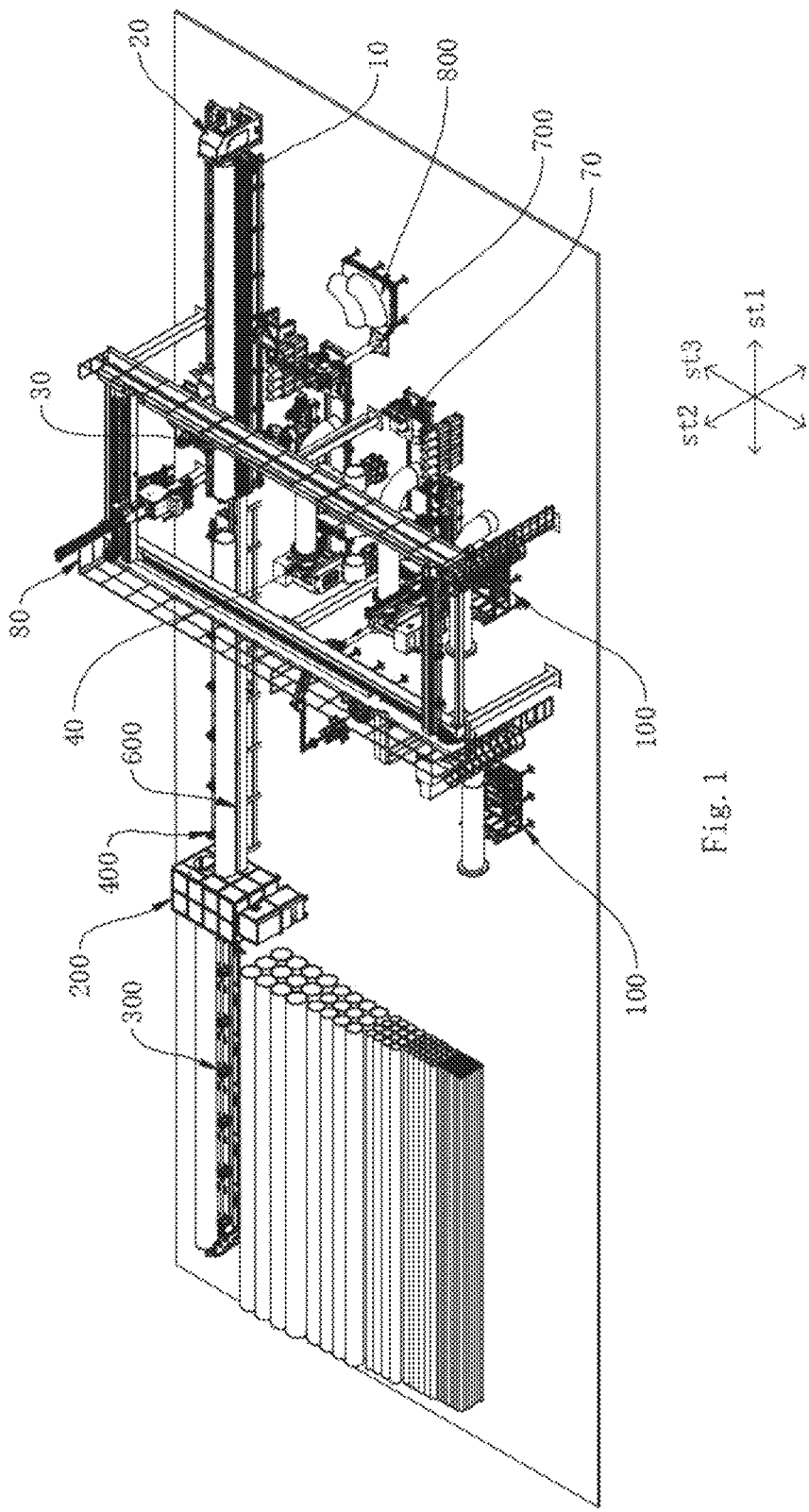
FIG. 1 is a schematic structural diagram of an intelligent machining line for pipe sections according to an example of the disclosure.

The implementation of objectives, functional features and advantages of the disclosure will be further described in conjunction with examples and with reference to accompanying drawings.

DETAILED DESCRIPTION OF THE INVENTION

The technical solutions in the examples of the disclosure will be described clearly and comprehensively below in conjunction with the accompanying drawings in the examples of the disclosure. Obviously, the described examples are only part of the examples of the present disclosure, not all of the examples. Based on the examples of the present disclosure, all other disclosure obtained by a person skilled in the art without creative effort fall within the protection scope of the present disclosure.

It should be noted that all directional indications (such as up, down, left, right, front, rear, etc.) in the examples of the disclosure are only used to explain the relative position relationship, motion situation, etc. between the components in a certain posture (as shown in the attached drawings). If the certain posture changes, the directional indication changes accordingly.

In the disclosure, unless otherwise explicitly specified and limited, the terms "connected", "fixed" and the like are to be interpreted broadly, for example, "fixed" may be a fixed connection, a detachable connection, or an integral connection; may be a mechanical connection, or an electrical connection; may be a direct connection, or may be indirectly connected through an intermediary; may be a communication between two elements or an interaction relationship between two elements, unless otherwise explicitly limited. For those skilled in the art, the specific meanings of the above terms in the disclosure can be understood according to specific circumstances.

In addition, if there are descriptions involving "first", "second", etc. in the examples of the disclosure, the descriptions of "first", "second", etc. are only used for descriptive purposes, and cannot be understood as indicating or implying their relative importance or implicitly indicating the number of indicated technical features. Thus, a feature defined by "first" and "second" may explicitly or implicitly include at least one of the features. In addition, the meaning of "and/or" appearing in the whole text includes three parallel schemes, taking "A and/or B" as an example, including scheme A, or scheme B, or scheme A and B simultaneously satisfied. In addition, technical solutions of various examples may be combined with each other, but it must be based on what can be achieved by a person skilled in the art. When the combination of technical solutions is contradictory or cannot be achieved, it should be deemed that such combination of technical solutions does not exist, and is not within the scope of protection required by the disclosure.

The intelligent machining line for pipe sections described herein includes at least one control unit designed to control some or all of the steps described and claimed herein for the pipe machining process. The control unit may be only one or formed by a plurality of different control units, e.g. at least one control unit associated with the equipment A, at least one control unit associated with the device B, and at least one control unit managing the controller for the production line C. Of course, depending on design choices and operational needs, different configurations can be envisaged. The term "control unit" means an electronic component that may include at least one of a digital processor (e.g., including at least one selected from the group consisting of CPU, GPU, GPGPU), a memory (or memories), analog circuitry, or a combination of one or more digital processing units and one or more analog circuitry. The control unit can be "configured" or "programmed" to perform certain steps: This can be done by virtually any means that allows the control unit to be configured or programmed. For example, where the control unit includes one or more CPUs and one or more memories, one or more programs may be stored in an appropriate group of memories connected to the one or more CPUs. The one or more programs containing instructions that, when executed by the one or more CPUs, program or configure the control unit to perform the operations described in relation to the control unit. Alternatively, if the control unit is or includes analog circuitry, the control unit circuitry may be designed to include circuitry configured for, in use, processing electrical signals in order to perform steps associated with the control unit. The control unit may include one or more digital units (e.g. of microprocessor type), or one or more analog units, or a suitable combination of digital and analog units; the control unit may be configured to coordinate all actions necessary to execute the instructions and instruction sets.

The disclosure provides an intelligent machining line for pipe sections used to perform derusting, cutting and welding on the pipe sections.

Figure 2:
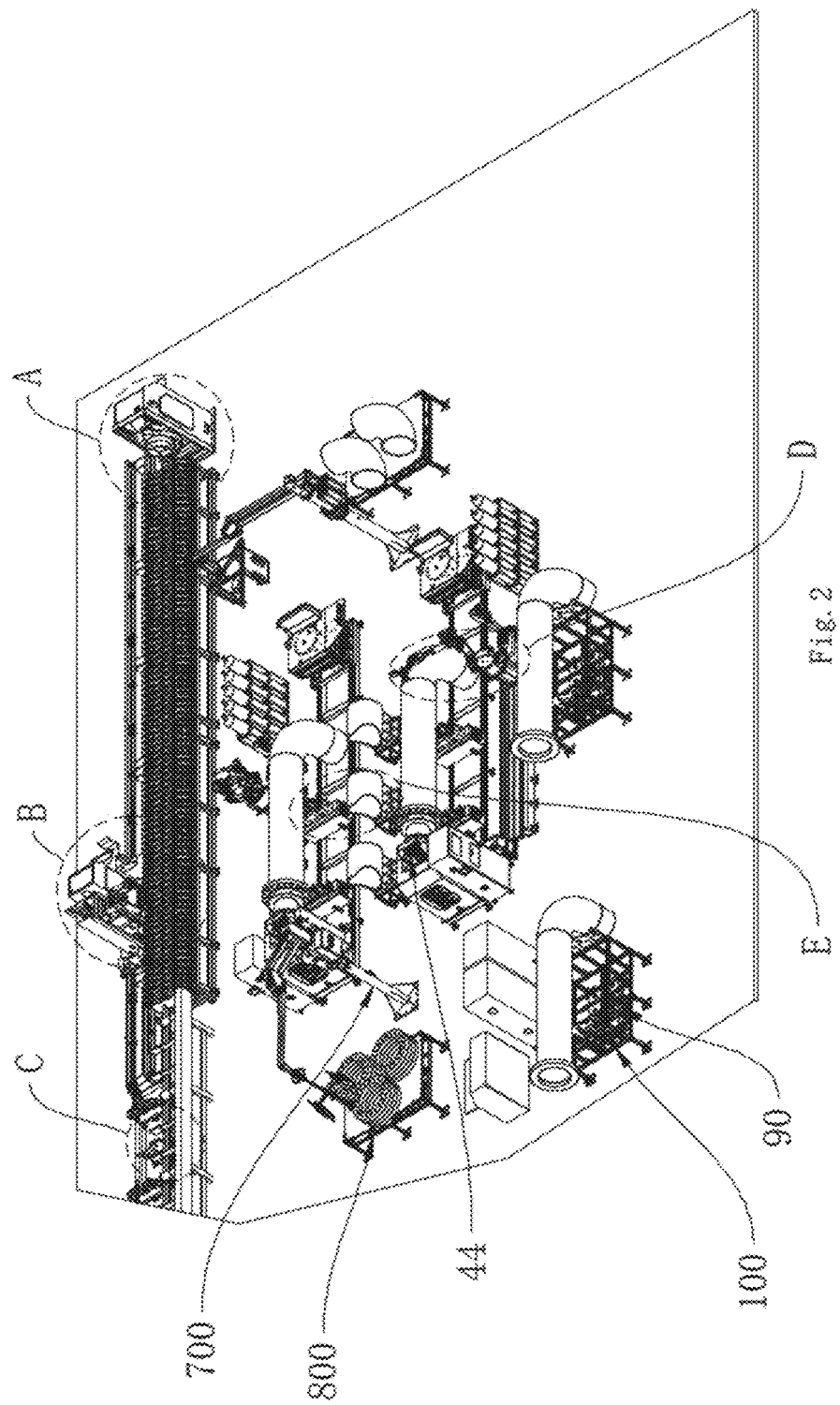
FIG. 2 is a schematic diagram of a partial structure in FIG. 1.

In an example of the disclosure, with reference to FIGS. 1 and 2, the intelligent machining line for pipe sections includes a cutting station, an assembly station and a finished product station.

With reference to FIGS. 1 and 2, the cutting station includes a first material conveying module 10, a clamping module 20, and a cutting module 30. The first material conveying module 10 is configured to convey and support a pipe section to be cut. The pipe section to be cut may be rusted or not.

Figure 5:
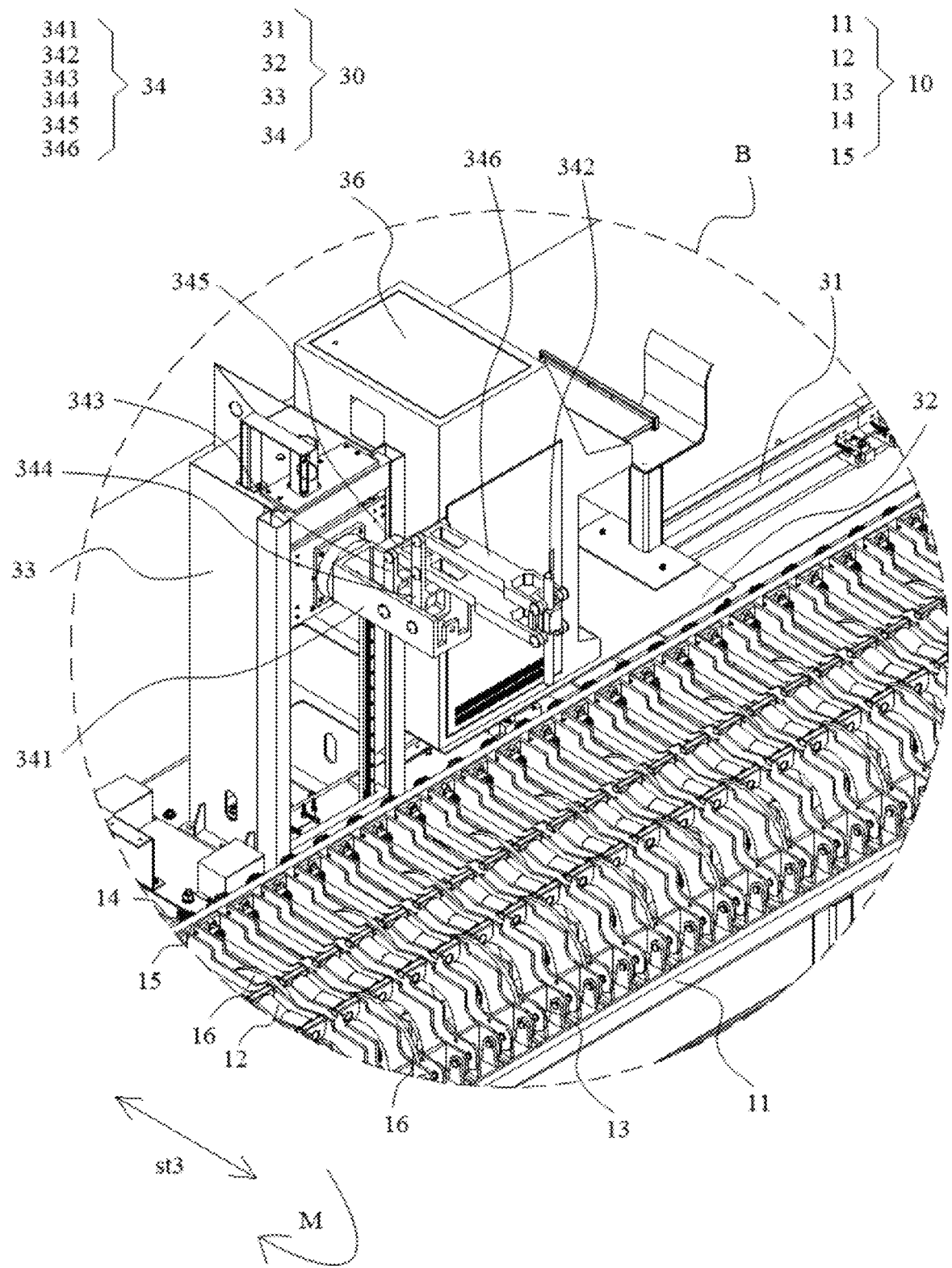
FIG. 5 is a partial enlarged view of portion B in FIG. 2.

In this example, with reference to FIGS. 1 and 2, the first material conveying module 10 may adopt a structure described below, as shown in FIG. 5. The first material conveying module 10 includes a first machine frame 11. A first conveying roller 12 is mounted on the first machine frame 11. The first conveying roller 12 is configured to convey the pipe section to move in the direction st1. A plurality of first conveying rollers 12 are provided. The plurality of first conveying rollers 12 are distributed at intervals in the direction st1. The first conveying rollers 12 are connected to the first machine frame 11 through first mounting frames 13. The first conveying rollers 12 are mounted at the first mounting frames 13. The plurality of first conveying rollers 12 are connected in one-to-one correspondence, through a plurality of first mounting frames 13, to the first machine frame 11. One ends of the plurality of first mounting frames 13 are all hinged to the first machine frame 11, and the other ends of the plurality of first mounting frames 13 are integrally arranged. The other ends of the plurality of first mounting frames 13 may be integrally arranged by a method as follows: the other ends of the plurality of first mounting frames 13 are all fixedly arranged at the connection plate 15. A first driving member 14 configured to drive the plurality of first conveying rollers 12 to rotate is mounted on the connection plate 15. The first driving member 14 includes a plurality of sprocket wheels and a chain. The chain is connected to the plurality of sprocket wheels. The plurality of sprocket wheels are connected to the plurality of first conveying rollers 12 in one-to-one correspondence. The first conveying roller 12 includes a first roller body and a fifth rotary shaft. The first roller body is keyed to the fifth rotary shaft, such that the first roller body rotates synchronously along with the fifth rotary shaft. The first roller body is configured to consist of two symmetrical cone frustum-shaped structures, and small ends of the two cone frustum-shaped structures are connected (see FIG. 15). One end of the fifth rotary shaft is rotatably connected to the first mounting frame 13, and the other end of the fifth rotary shaft penetrates the connection plate 15. The sprocket wheel is keyed to one end, penetrates to the outside of the connection plate 15, of the fifth rotary shaft. The first driving member 14 further includes a first driving motor. The first driving motor is mounted at the connection plate 15. The first driving motor is configured to drive the chain to work. The chain works to rotate the plurality of sprocket wheels. The plurality of sprocket wheels may drive the fifth rotary shafts and the first roller bodies to rotate while rotating. When the first roller body rotates, the pipe section located on the first roller body may move in the direction st1 and rotate forwards and backwards along with the first driving motor, such that the pipe can move back and forth on the first material conveying module 10. A second driving member configured to turn over the plurality of first mounting frames 13 around a hinged joint is mounted on the first machine frame 11. The second driving member may adopt a driving cylinder. A stretchable end of the driving cylinder is hinged to the connection plate 15. A base of the driving cylinder is mounted at the first machine frame 11. When stretching or retracting, the driving cylinder may jack or drop the connection plate 15 respectively, and also turn over the plurality of first mounting frames 13 around the hinged joint. Two groups of driven disks 16 are further arranged on the first machine frame 11. A plurality of driven disks are included in each group of driven disks 16. The plurality of driven disks 16 in each group are uniformly distributed in the direction st1. The driven disk 16 is rotatably mounted at the first machine frame 11.

Figure 4:
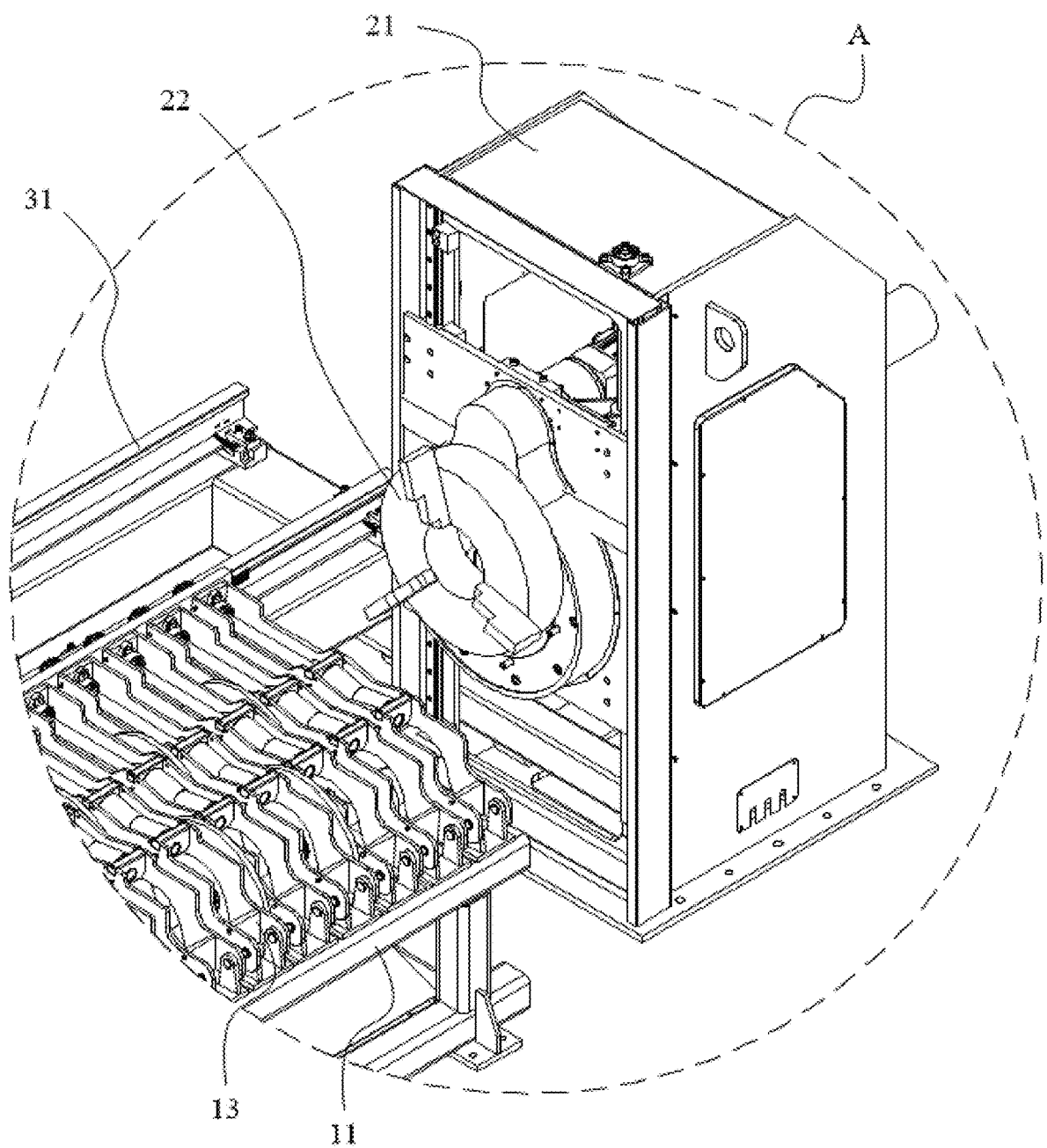
FIG. 4 is a partial enlarged view at portion A in FIG. 2.

With reference to FIG. 4, the clamping module 20 is configured to clamp the pipe section to be cut and drive the pipe section to be cut to rotate on the first material conveying module 10. The cutting module 30 is configured to cut the pipe section to be cut. The clamping module 20 is arranged at an end of the first material conveying module 10. When the pipe section rotates on the first material conveying module 10, the first driving member 14 drop the plurality of first mounting frames 13. In this case, the pipe section is in contact with the two groups of driven disks 16, the pipe section rotates on the first material conveying module 10, and the driven disks 16 rotate around axes of the driven disks under the action of rotation of the pipe section. Thus, friction force between the pipe section and the first material conveying module 10 can be reduced, and the pipe section can be machined advantageously.

In this example, with reference to FIG. 4, the clamping module 20 includes a second machine frame 21, a first chuck 22, a third driving member and a fourth driving member. The first chuck 22 is configured as a scroll chuck. The scroll chuck may be an electric scroll chuck or a pneumatic scroll chuck, which is not limited herein. The scroll chuck is configured to clamp a pipe section to be machined. The first chuck 22 is slidably mounted to the second machine frame 21. A first guide rail is fixedly arranged on the second machine frame 21. A first slide table is mounted on the first guide rail. The first slide table moves in a direction st2. The direction st2 is arranged perpendicular to the ground. The third driving member is mounted at one end of the first slide table. The first chuck 22 is mounted at the other end of the first slide table. The third driving member is configured as a driving motor. An output end of the third driving member is connected to the first chuck 22. The third driving member is configured to drive the first chuck 22 to rotate. When the first chuck 22 clamps the pipe section to be machined, the first chuck 22 may also drive the pipe section to be machined to rotate while rotating. The fourth driving member is mounted at the second machine frame 21. The fourth driving member is configured as a driving cylinder member or a hydraulic member. A stretchable end of the fourth driving member is connected to the first slide table. The fourth driving member stretches or retracts to drive the first slide table to ascend or descend. The first slide table may drive the first chuck 22 and the third driving member to ascend or descend while ascending or descending. Under the action of the fourth driving member, the first slide table may be driven to ascend or descend, and then the first chuck 22 may be driven to ascend or descend. By adjusting an axis of the first chuck 22 and an axis of the pipe section through ascending or descending of the first chuck 22, the axis of the first chuck 22 coincides with the axis of the pipe section. Thus, the clamping module 20 in this structure can clamp pipe sections with different diameters. In this example, the pipe section to be machined is transferred through the first conveying roller 12 in the first material conveying module 10. The pipe section moves to the clamping module 20 in the direction st1 in the first material conveying module 10. When the pipe section to be machined abuts against the first chuck 22, the first driving member 14 drops the plurality of first mounting frames 13, the driven disk 16 abuts against a surface to be machined and is not in contact with the first conveying roller 12. In this case, the axis of the pipe section to be machined is fixed, and a user operates the first chuck 22 to align a center of the first chuck 22 with the axis of the pipe section to be machined, and clamp the pipe section to be machined. When the pipe section is machined and needs to be turned over after the first chuck 22 clamps the pipe section to be machined, the third driving member may drive the first chuck 22 to rotate, so as to cause the first chuck 22 to rotate the pipe section. The driven disk 16 may rotate around the axis of the driven disk during rotation of the pipe section, such that the friction force of the pipe section when rotating on the first material conveying module 10 can be reduced in this structure.

With reference to FIG. 5, the cutting module 30 is slidably arranged at a side of the first material conveying module 10, and moves in a direction of the axis of the pipe section.

In this example, with reference to FIG. 5, the cutting module 30 includes a second guide rail 31, a second slide table 32, a third machine frame 33 and a cutting member 34. The second guide rail 31 is arranged at a side of the first machine frame 11. The second slide table 32 is mounted at the second guide rail 31. The second slide table 32 slides in the direction st1. The third machine frame 33 is fixedly arranged at the second slide table 32. The cutting member 34 is mounted at the third machine frame 33. In such an arrangement, when the second slide table 32 slides in the direction st1, the third machine frame 33 and the cutting member 34 may be driven to slide together in the direction st1. Thus, the third machine frame 33 and the cutting member 34 can slide along the axis of the pipe section to be cut, and the cutting member 34 cuts the pipe section advantageously. When cutting the pipe section, the cutting member 34 starts cutting from an end, far away from the clamping module 20, of the pipe section.

In this example, with reference to FIG. 5, the cutting member 34 is slidably mounted at the third machine frame 33. In this case, the cutting member 34 moves in the direction st2. A third guide rail is fixedly arranged on the third machine frame 33. A third slide table for mounting the cutting member 34 is mounted on the third guide rail. The cutting member 34 includes a first mounting seat 341, a multi-link structure and a cutting gun 342. The multi-link structure is hinged to the first mounting seat 341. The cutting gun 342 is hinged to the multi-link structure. The multi-link structure may rotate the cutting gun 342. The multi-link structure includes a first overturning frame 343, a second overturning frame 344, a third overturning frame 345 and a fourth overturning frame 346. The first overturning frame 343 and the second overturning frame 344 are abreast arranged. In addition, a bottom of the first overturning frame 343 and a bottom of the second overturning frame 344 are both hinged to the first mounting seat 341. The third overturning frame 345 and the fourth overturning frame 346 are stacked. An end of the third overturning frame 345 is hinged to a top of the first overturning frame 343. The third overturning frame 345 is further hinged to the second overturning frame 344. An end of the fourth overturning frame 346 is hinged to a top of the second overturning frame 344. In addition, the fourth overturning frame 346 is located above the third overturning frame 345. The cutting gun 342 is hinged to the third overturning frame 345 and the fourth overturning frame 346. When the multi-link structure is deformed in a direction st3, the cutting gun 342 may be driven to rotate around a direction M. A thirteenth driving member configured to drive the multi-link structure to move in the direction st3 is further arranged on the first mounting seat 341. The thirteenth driving member may be configured as a driving cylinder. When the thirteenth driving member is configured as the driving cylinder, a stretchable end of the thirteenth driving member is hinged to the first overturning frame 343 or the second overturning frame 344. The stretchable end of the thirteenth driving member stretches or retracted to swing the first overturning frame 343 and the second overturning frame 344 around hinged joints of the first overturning frame and the second overturning frame with the first mounting seat 341. Then, the third overturning frame 345 and the fourth overturning frame 346 move in the direction st3, and the multi-link structure moves in the direction st3 and drives the cutting member 342 to rotate around the direction M. A fifth driving member is further mounted at the third slide table, and the fifth driving member is configured to rotate the first mounting seat 341 on the third slide table. The fifth driving member is configured as a second driving motor. An output end of the second driving motor is connected to the first mounting seat 341. The second driving motor works to rotate the first mounting seat 341. The first mounting seat 341 rotates to rotate the multi-link structure and the cutting gun 342. In this structure, a degree of freedom of the cutting gun 342 can be increased, and the cutting gun 342 can perform all-round machining outside the pipe section. For example, the cutting gun cut gaps with different specifications outside the pipe section.

Further, in this example, with reference to FIG. 5, the cutting module 30 further includes an operation table 36. The operation table 36 is fixedly arranged at the second slide table 32. The operation table 36 is configured to control the cutting gun 342 to perform cutting work. The operation table 36 drives, through a control unit, the cutting gun 342 to perform the cutting work.

Figure 15:
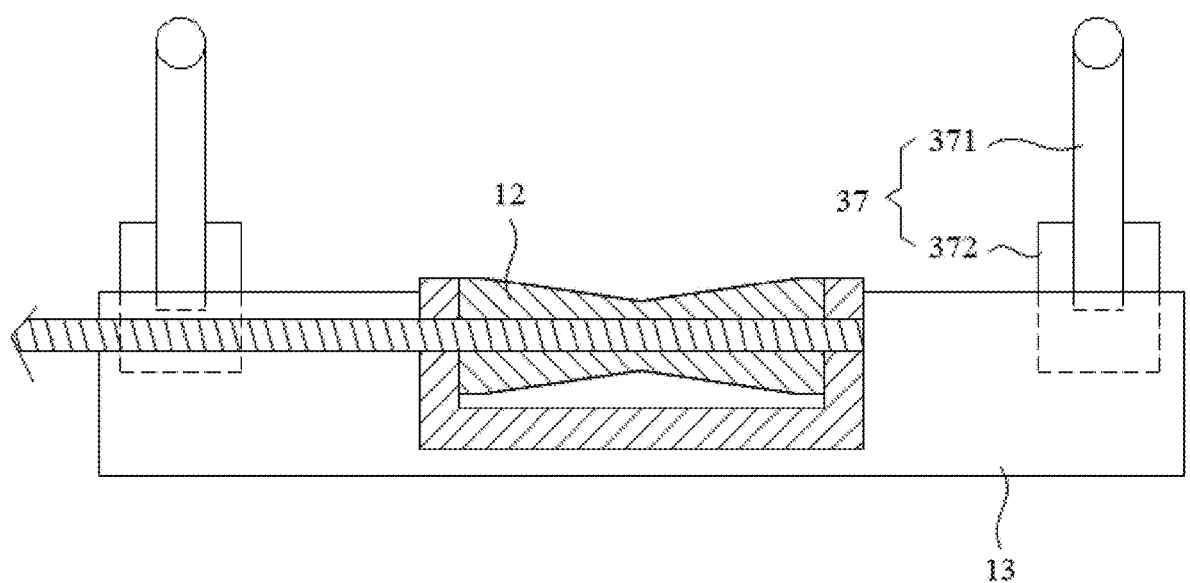
FIG. 15 is a schematic structural diagram of a protective assembly in an intelligent machining line for pipe sections according to example of the disclosure.

Further, in this example, with reference to FIG. 15, the cutting station further includes a protective assembly 37. The protective assembly 37 is detachably mounted in the first material conveying module 10. When the intelligent machining line for pipe sections machines a pipe section with a larger diameter, the protective assembly 37 may be mounted in the first material conveying module 10, in order to avoid the situation that the pipe section with the larger diameter falls from the first material conveying module 10 after cutting. The protective assembly 37 includes two groups of symmetrically arranged guardrails 371 and a plurality of mounting clamps 372. The two groups of guardrails 371 are symmetrically arranged with respect to the first material conveying module 10. The plurality of mounting clamps 372 are divided into two groups and fixed to the first mounting frame 13. The two groups of mounting clamps 372 are arranged far away from the first conveying roller 12. Thus, influence of the mounting clamp 372 on the first conveying roller when the first conveying roller 12 drives the pipe section to move in the direction st1 is avoided. The guardrail 371 is inserted into the mounting clamp 372. The mounting clamp 372 is configured in a U-shaped structure. When in use, the guardrail 371 is inserted into an opening in the mounting clamp 372, such that the protective assembly 37 may be mounted in the first material conveying module 10. In this example, the user may choose not to mount the protective assembly 37 for the pipe section with a smaller diameter during machining.

In this example, the user may place the pipe section to be cut on the first material conveying module 10 through a crane, then transfer the pipe section through the first material conveying module 10, and move the pipe section to be cut to the clamping module 20. Then, the user operates the clamping module 20 to clamp an end of the pipe section to be cut. In this case, the clamping module 20 may rotate the pipe section to be cut around an axis of the pipe section to be cut on the first material conveying module 10. After the pipe section to be cut is clamped by the clamping module 20, the cutting module 30 moves in the direction of the axis of the pipe section to be cut, to the end, far away from the clamping module 20, of the pipe section to be cut, and starts cutting work from this end. In this example, the first material conveying module 10, the clamping module 20 and the cutting module 30 are not limited.

With reference to FIGS. 1, 2, 7 and 8, the assembly station is located downstream of the cutting station, and a pipe section machined by the cutting station enters the assembly station for being assembled. The assembly station includes a support module 40, a welding module 50, a first fitting storage module 60 and a first transfer module 80. A plurality of support modules 40, a plurality of welding modules 50 and a plurality of first fitting storage modules 60, may be arranged.

Figure 8:
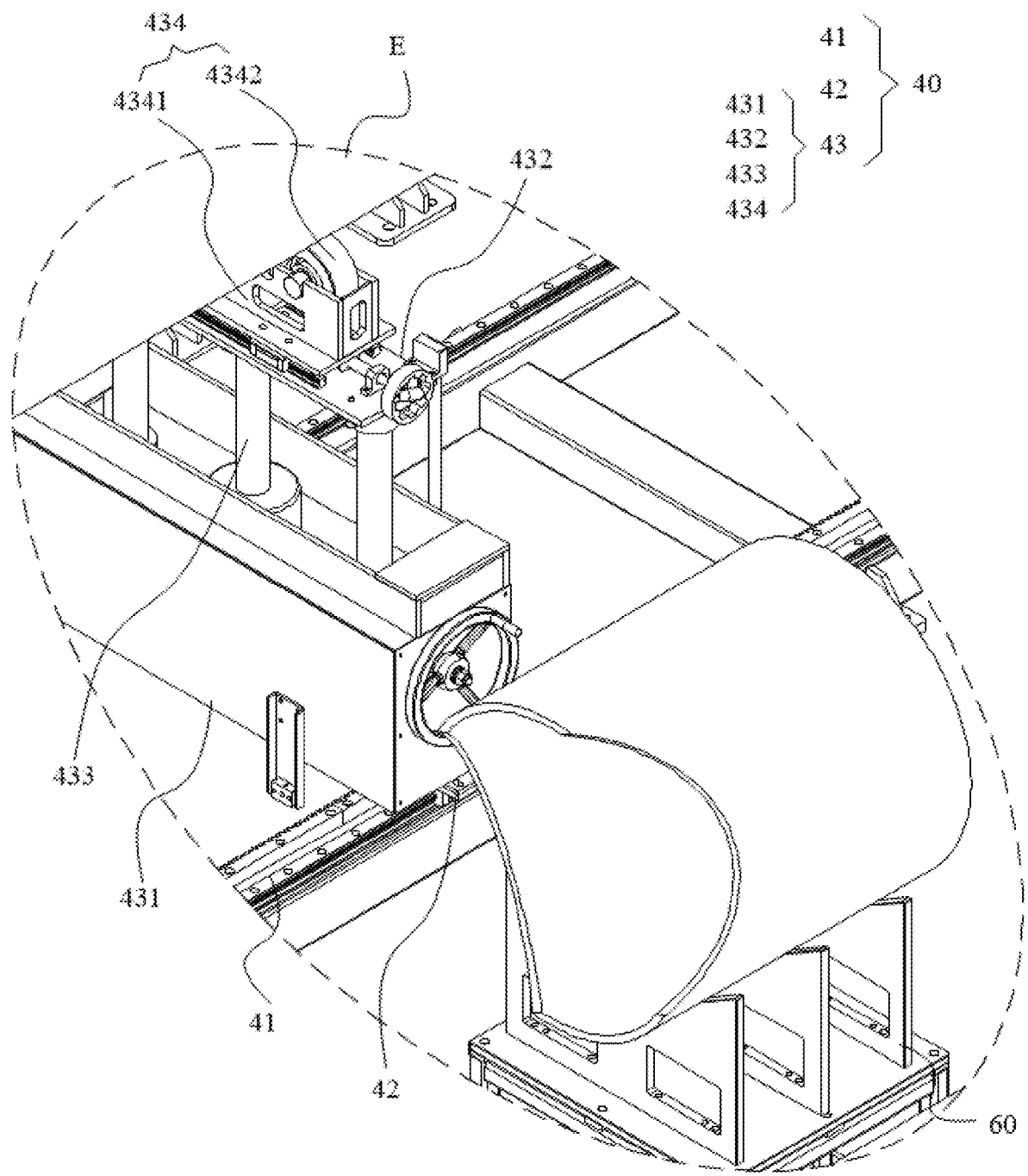
FIG. 8 is a partial enlarged view of portion E in FIG. 2.

With reference to FIG. 8, the support module 40 is configured to support the pipe section to be machined, and may clamp and rotate the pipe section to be machined. The pipe section to be machined may be a pipe section cut by the cutting station or a pipe section not cut by the cutting station.

Figure 17:
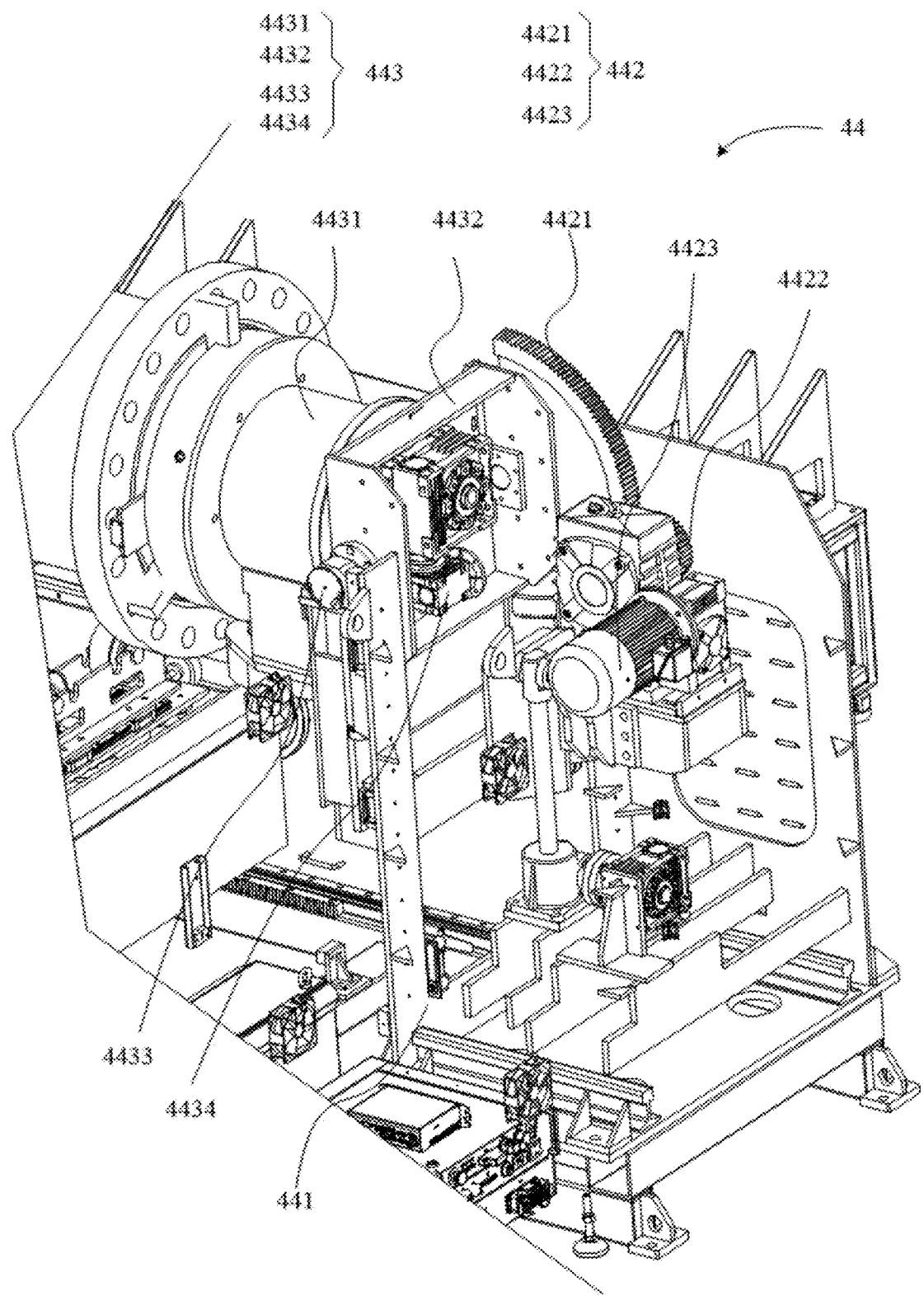
FIG. 17 is a schematic structural diagram of a clamping assembly in FIG. 2 according to an example.

In this example, with reference to FIGS. 8 and 17, the support module 40 includes a fourth guide rail 41, a support assembly 43 and a clamping assembly 44. The fourth guide rail 41 is arranged downstream of the cutting station. The fourth guide rail 41 is fixedly arranged at a preset position on the ground. A fourth slide table 42 is mounted at the fourth guide rail 41. The support assembly 43 is fixedly arranged at the fourth slide table 42. The support assembly 43 may slide along the fourth guide rail 41 under the action of the fourth slide table 42. In this example, the support assembly 43 includes a slide seat 431, a mounting plate 432, a sixth driving member 433 and a support member 434. The slide seat 431 is fixedly arranged at the fourth slide table 42. The fourth slide table 42 is connected to the slide seat 431 through bolt locking. The mounting plate 432 is mounted at the slide seat 431 through the sixth driving member 433. The sixth driving member 433 is configured to drive the mounting plate 432 to ascend and descend. The sixth driving member 433 may be configured as a cylinder driving member, a hydraulic driving member or a motor driving member. The support member 434 is mounted at the mounting plate 432. Thus, the mounting plate 432 ascends or descends to drive the support member 434 to ascend or descend. The support member 434 is configured to support the pipe section. In this example, the support member 434 ascends or descends in order to enable the support assembly 43 to support pipe sections with different diameters with a desirable support effect. The support member 434 includes a first mounting frame 4341 and a bearing 4342. The first mounting frame 4341 is slidably mounted at the mounting plate 432 through a linear driving module. The bearing 4342 is mounted at the first mounting frame 4341, and abuts against the outside of the pipe section. At least two bearings 4342 are arranged. When the pipe section rotates on the support member 434, the bearing 4342 may rotate around an axis of the bearing. Thus, the friction force generated during the rotation of the pipe section can be reduced, a position of the bearing 4342 can be adjusted under the action of the linear driving module, and two bearings 4342 can abut against the outside of the pipe section.

In an example, with reference to FIG. 17, the clamping assembly 44 includes a fourth machine frame 441, a clamping member 443 and a seventh driving member 442. The clamping member 443 and the seventh driving member 442 are both mounted at the fourth machine frame 441. The clamping member 443 is configured to clamp the pipe section to be machined, and rotate the pipe section to be machined on the support assembly 43. The seventh driving member 442 is configured to turn the clamping member 443 over. In this example, an overturning direction of the clamping member 443 is perpendicular to a moving direction of the support member 434. In this example, specific structures of the clamping member 443 and the seventh driving member 442 are not limited.

In this example, with reference to FIG. 17, the clamping member 443 includes a second chuck 4431, a mounting seat and an eighth driving member 4434. The second chuck 4431 is configured as a scroll chuck, and the scroll chuck adopts an electric chuck member, a pneumatic chuck member or a manually driven chuck member. The mounting seat is connected to the fourth machine frame 441 through a first rotary shaft 4433. A number of the first rotary shafts 4433 is two. The two first rotary shafts 4433 are symmetrically fixed outside the mounting seat. Axes of the two first rotary shafts 4433 are coaxially arranged. The first rotary shaft 4433 is rotatably engaged with the fourth machine frame 441. That is, the first rotary shaft 4433 may rotate on the fourth machine frame 441. The second chuck 4431 and the eighth driving member 4434 are both mounted at the mounting seat. The second chuck 4431 is configured to clamp the pipe section to be machined. The eighth driving member 4434 is configured to rotate the second chuck 4431, so as to cause the second chuck 4431 to rotate the pipe section to be machined. The eighth driving member 4434 drives the second chuck 4431 to rotate, so as to rotate the pipe section to be machined. The eighth driving member 4434 is configured as a third driving motor, and an output end of the eighth driving member 4434 is connected to the second chuck 4431. The eighth driving member 4434 works to rotate the second chuck 4431, so as to cause the second chuck 4431 to rotate the pipe section.

In this example, with reference to FIG. 17, the seventh driving member 442 may adopt the following structure. The seventh driving member 442 includes a first meshing tooth 4421, a second meshing tooth 4422 and a fourth driving motor 4423. The first meshing tooth 4421 is fixedly arranged at one rotary shaft of the two first rotary shafts 4433. The second meshing tooth 4422 is mounted at an output end of the fourth driving motor 4423. The second meshing tooth 4422 meshes with the first meshing tooth 4421. The fourth driving motor 4423 works to rotate the second meshing tooth 4422. The second meshing tooth 4422 rotates the first meshing tooth 4421. The first meshing tooth 4421 rotates to rotate the first rotary shaft 4433, so as turn over the mounting seat. The first meshing tooth 4421 has a sector tooth structure. The second meshing tooth 4422 has a circular tooth structure. The sector tooth is a half circular tooth.

In this example, an overturning angle of the mounting seat is 80 degrees to 100 degrees. When the mounting seat is turned over to 90 degrees, the second chuck 4431 faces upwards. In this case, the user may mount, at the second chuck 4431, a flange of the pipe section to be machined required for welding, and then clamp the flange by the second chuck 4431. Then, the mounting seat drives the flange to turn over, so as to cause the flange to align with and abut against one end of the pipe section to be machined. Then, the flange is welded by the welding module 50 (see FIG. 7) to the pipe section to be machined. Through such an operation, the flange having a large structure can be connected to the pipe section to be machined advantageously, and the pipe section to be machined can be machined by the user advantageously. This operation is more stable than a method of welding the flange with the flange lifted by a crane. Especially after the flange is aligned with a welding position of the pipe section to be machined, the flange is more stable in a welding process through restriction by the second chuck 4431. In this example, the user may place the flange on the second chuck 4431 through a power device 750 (see FIG. 10).

Figure 7:
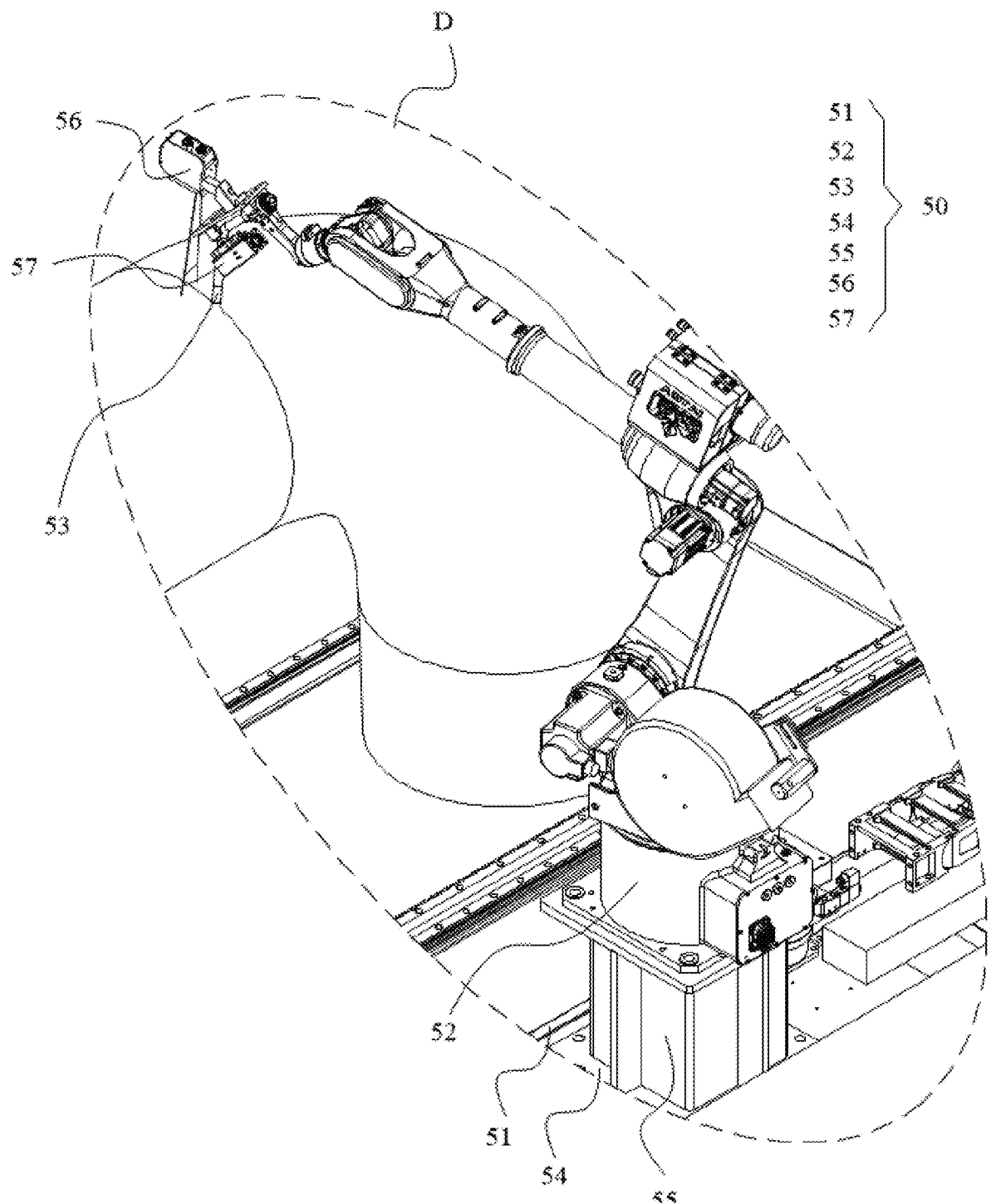
FIG. 7 is a partial enlarged view at portion D in FIG. 2.

In this example, with reference to FIG. 7, the welding module 50 includes a fifth guide rail 51, a multi-axis mechanical arm 52, a welding gun 53, a locating camera 56 and a monitoring camera 57. A fifth slide table 54 is connected to the fifth guide rail 51. The fifth slide table 54 slides along the fifth guide rail 51. The multi-axis mechanical arm 52 is fixedly arranged at the fifth slide table 54. The fifth slide table 54 is fixedly provided with a mechanical arm mounting seat 55 through bolt locking. The multi-axis mechanical arm 52 is fixedly arranged at the mechanical arm mounting seat 55 through bolt locking. Under the action of the mechanical arm mounting seat 55, a height of a tail end of the multi-axis mechanical arm 52 can be further increased, and the multi-axis mechanical arm 52 can be used advantageously. The welding gun 53, the locating camera 56 and the monitoring camera 57 are both mounted at the tail end of the multi-axis mechanical arm 52. The locating camera 56 is configured as a laser locating camera. The laser locating camera is configured to locate a welding position. The monitoring camera 57 is configured as a molten pool monitoring camera. The molten pool monitoring camera is configured to detect a welding trajectory of the welding gun 53 during a welding operation. In this example, the laser locating camera is configured to locate the welding position and feed back image information of the welding position to the control unit. The control unit controls the multi-axis mechanical arm 52 to operate the welding gun 53 according to the image information, so as to cause the welding gun 53 to perform the welding operation along the welding position. The molten pool monitoring camera is configured to detect the welding trajectory of the welding gun 53 during the welding operation, and feed the welding trajectory back to the control unit. The control unit feeds back the welding trajectory to the user through a display, and the user determines whether the welding is qualified according to the welding trajectory fed back. The user can also compute accuracy of the welding module 50 according to repeated welding trajectories, and maintain the welding module 50 according to the accuracy.

With reference to FIG. 8, the first fitting storage module 60 is configured to store fittings. The fittings include a branch pipe section, an elbow pipe, the flange, etc.

In this example, with reference to FIG. 8, the first fitting storage module 60 is configured as a storage rack. The storage rack is erected at a side of the support module 40. The storage rack is configured to store the branch pipe, the elbow pipe, the flange, etc.

Figure 9:
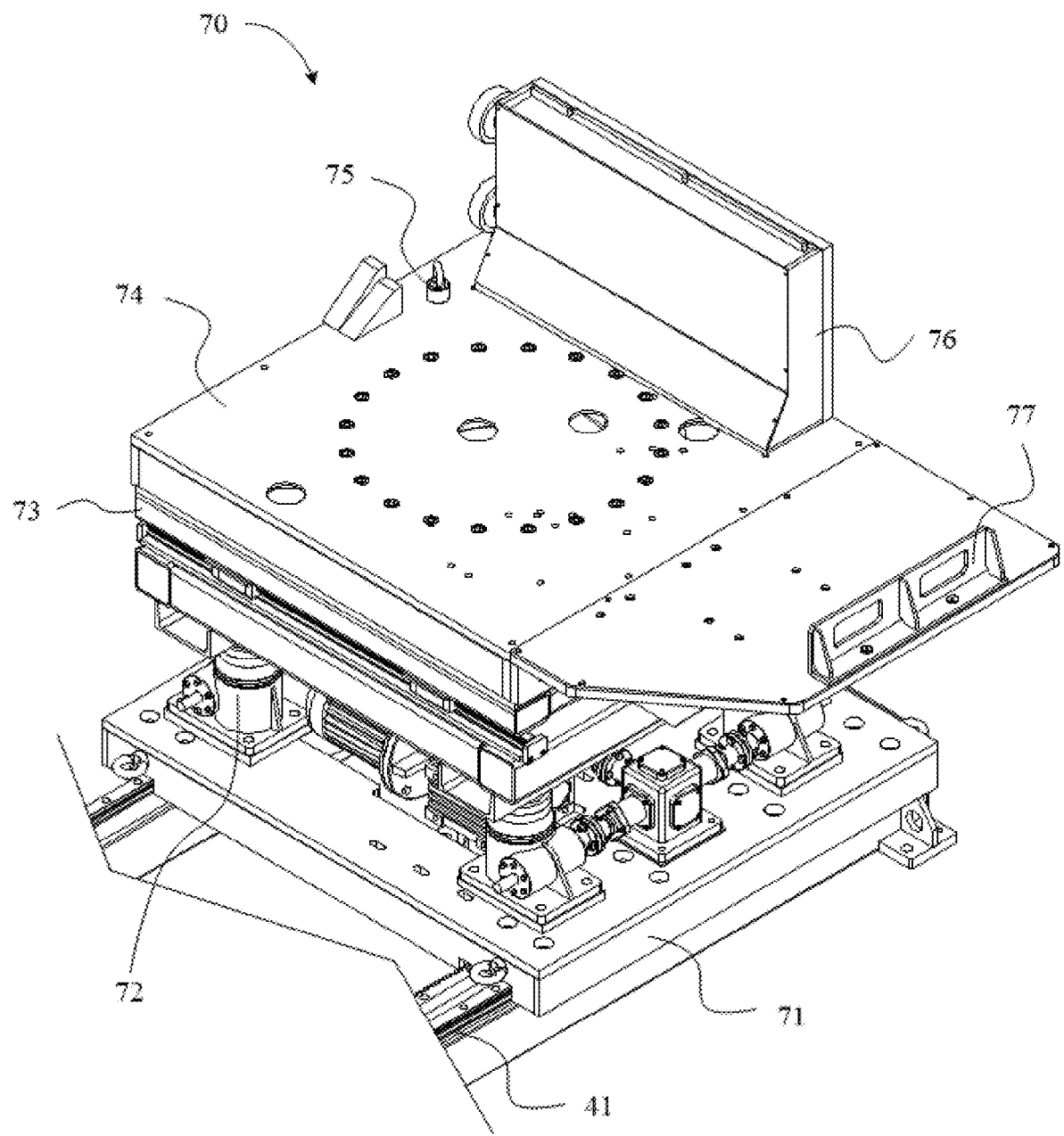
FIG. 9 is a schematic structural diagram of a material placement assembly in FIG. 1 according to an example.

In this example, with reference to FIG. 9, the assembly station further includes a material placement assembly 70. The material placement assembly 70 is used for the fittings such as the branch pipe, the elbow pipe and the flange to be placed. The material placement assembly 70 is slidably mounted at the fourth guide rail 41.

In this example, with reference to FIG. 9, the material placement assembly 70 may adopt the following structure. The material placement assembly 70 includes a first movable seat 71, a ninth driving member 72, a pedestal 73 and a placement table 74. The first movable seat 71 is slidably mounted at the fourth guide rail 41. The pedestal 73 is mounted at the first movable seat 71 through the ninth driving member 72. The ninth driving member 72 is configured to drive the pedestal 73 to ascend and descend. The ninth driving member 72 may drive the pedestal 73 to ascend and descend through the cylinder driving member, the hydraulic driving member or the motor driving member. The placement table 74 is mounted at the pedestal 73. A sixth rotary shaft is arranged between the placement table 74 and the pedestal 73. When the user pushes the placement table 74, the placement table 74 may rotate around the sixth rotary shaft. A second rotary shaft is fixed to one of the pedestal 73 and the placement table 74 and rotates with respective to the other of the pedestal and the placement table. Thus, when the user pushes the placement table 74, the placement table 74 may rotate around the sixth rotary shaft on the pedestal 73. A positioning structure 75 is also arranged between the placement table 74 and the pedestal 73. The positioning structure 75 is configured to position the placement table 74 at a preset position. The positioning structure 75 includes a plurality of positioning holes and positioning pins. The plurality of positioning holes are provided in a surface, close to the placement table 74, of the pedestal 73 and are distributed in a circumferential manner. A through hole for the positioning pin to penetrate therethrough is provided in the placement table 74. The positioning pin penetrates the through hole to be inserted into one of the positioning holes. The placement table 74 may be positioned at the preset position through matching of the positioning pin with the through hole and the positioning hole. The material placement assembly 70 further includes a placement frame 76. The placement frame 76 is fixedly arranged at the placement table 74. The placement table 74 is used for the fittings such as the elbow pipe, the flange or the branch pipe to be placed. The placement frame 76 is used for the flange to be placed. When the flange is placed on the placement table 74, the flange is in a horizontal state, and when it is placed on the placement frame 76, it is in an upright state. In this example, the pedestal 73 drives the placement table 74 to ascend or descend, and may simultaneously drive the placement frame 76 to ascend or descend. Thus, the fitting can be pre-aligned with the pipe section to be machined.

In this example, with reference to FIG. 9, a limiting member 77 for restricting the elbow pipe is inserted into a top surface of the placement table 74. Thus, during machining, one end of the elbow pipe is restricted, and the other end of the elbow pipe can correspond to an end of the pipe section to be machined, at which welding by the welding module 50 is performed advantageously. The limiting member 77 is configured as a limiting plate. The limiting plate is inserted into the placement table 74. The top surface of the placement table 74 is provided with a plurality of adjustment recesses for the limiting plate to be inserted. An angle of the limiting plate on the top surface of the placement table 74 may be adjusted through the plurality of adjustment recesses, such that the limiting plate is applied to limitation on elbow pipes with different structures advantageously.

Figure 19:
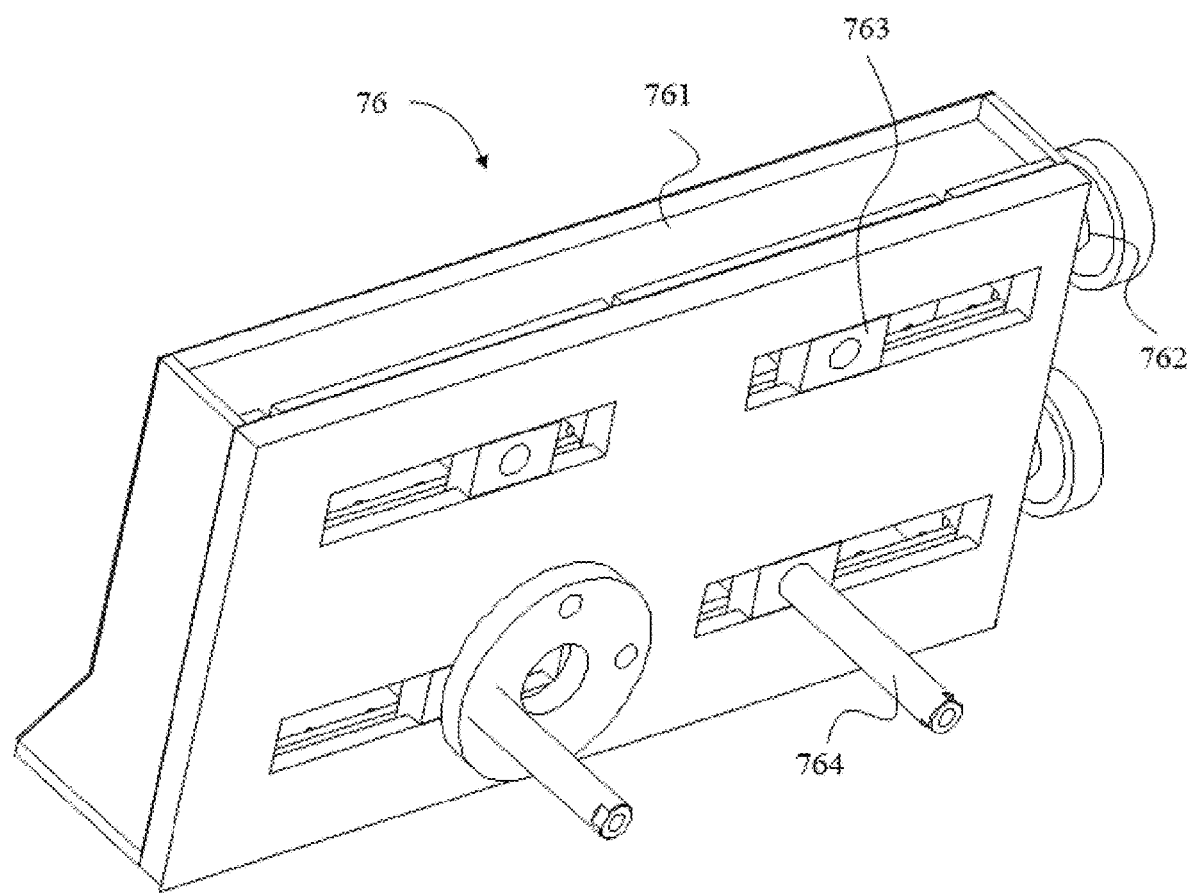
FIG. 19 is a schematic structural diagram of a placement frame in FIG. 9 according to an example.

In this example, with reference to FIGS. 9 and 19, the placement frame 76 may adopt the following structure. The placement frame 76 includes a fifth machine frame 761. A bidirectional screw 762 is mounted in the fifth machine frame 761. Two mounting rods 764 are connected to the bidirectional screw 762. Two connection blocks 763 are in threaded connection to the bidirectional screw 762. A guide structure is arranged on the fifth machine frame 761. When the bidirectional screw 762 rotates, the guide structure causes the two connection blocks 763 to get close to each other or far away from each other. The guide structure is configured as a guide hole. The two mounting rods 764 are inserted into the two connection blocks 763 respectively. The mounting rod 764 is used for the flange to be placed. Thus, when the mounting rod 764 needs to be used, the mounting rod 764 merely needs to be inserted into the connection block 763. When the placement frame 76 is used, the placement table 74 needs to be rotated, and the placement frame 76 is arranged towards one end of the pipe section to be machined, so as to cause the flange to correspond to the pipe section to be machined. Specifically, in this example, by rotating the bidirectional screw, a space between the two mounting rods can be adjusted. Thus, the placement frame 76 can be used for flanges with different specifications to be placed, and a use effect of the disclosure is further improved.

With reference to FIGS. 1, 2 and 7, the first transfer module 80 is configured to transfer the pipe section to be machined to the support module 40, and then the first transfer module 80 transfers the fitting and attach the fitting to the pipe section to be machined. The welding module 50 is configured to weld fitting to the pipe section to be machined.

Figure 3:
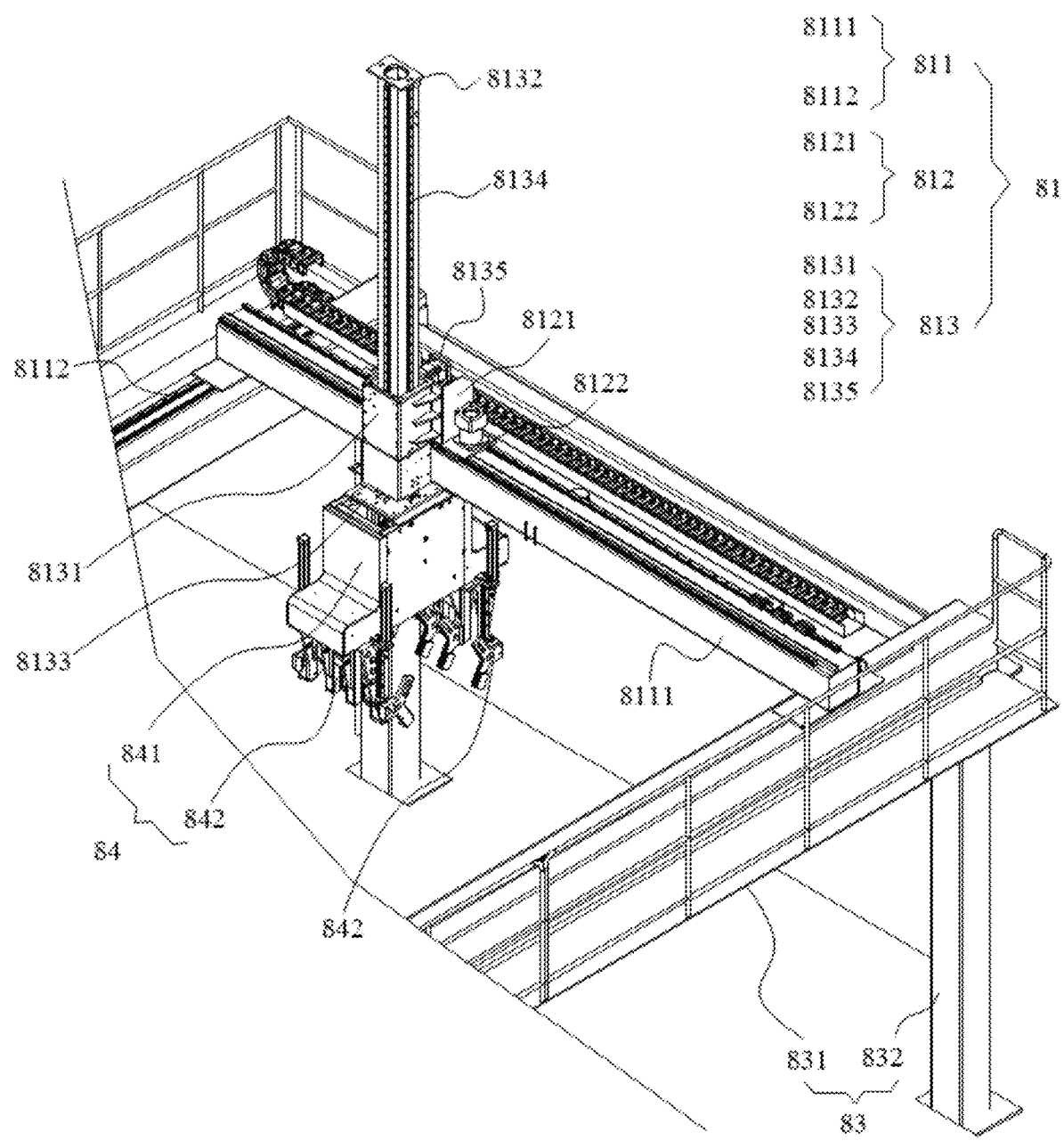
FIG. 3 is a schematic structural diagram of a driving structure and a second grabbing assembly in FIG. 1 according to an example.

In this example, with reference to FIG. 3, the first transfer module 80 may adopt the following structure. The first transfer module 80 includes a driving structure 81 and a grabbing assembly. The grabbing assembly is configured to grab the pipe section to be machined, the fitting or the assembled pipe section. The driving structure 81 is configured to drive the grabbing assembly to move among the assembly station, the cutting station and the finished product station. In this example, the first transfer module 80 transfers the pipe section to be machined and the fitting, and attach the fitting to the pipe section to be machined. The operation can reduce difficulty of manual transfer of large flanges and branch pipes, improve production efficiency of the pipe section, and solve the technical problems in the prior art. In this example, the first transfer module 80 may be further configured as a transfer robot. A cut pipe section is transferred by the transfer robot from a feeding area in the first material conveying module 10 to the assembly station, or the fitting is attached by the transfer robot to the pipe section to be machined.

In this example, the cut pipe section is transferred by the first transfer module 80 from the first material conveying module 10 to the support module 40. The support module 40 supports and clamps the pipe section to be machined, and then the first transfer module 80 attaches the fitting required by a production process of the pipe section to the pipe section to be machined. After the fitting is attached to the pipe section to be machined, the welding module 50 welds the fittings to the pipe section to be machined. After one fitting is welded to the pipe section to be machined, the first transfer module 80 may transfer a next fitting and attach the fitting to the pipe section being machined, and then the welding module 50 welds the fitting and the pipe section together. In this example, the support module 40, the welding module 50, the first fitting storage module 60 and the first transfer module 80 are not limited.

With reference to FIG. 2, the finished product station is arranged downstream of the assembly station, and the finished product station includes a second transfer module 90 and a finished product storage module 100.

The finished product storage module 100 is configured to store the assembled pipe section.

Figure 12:
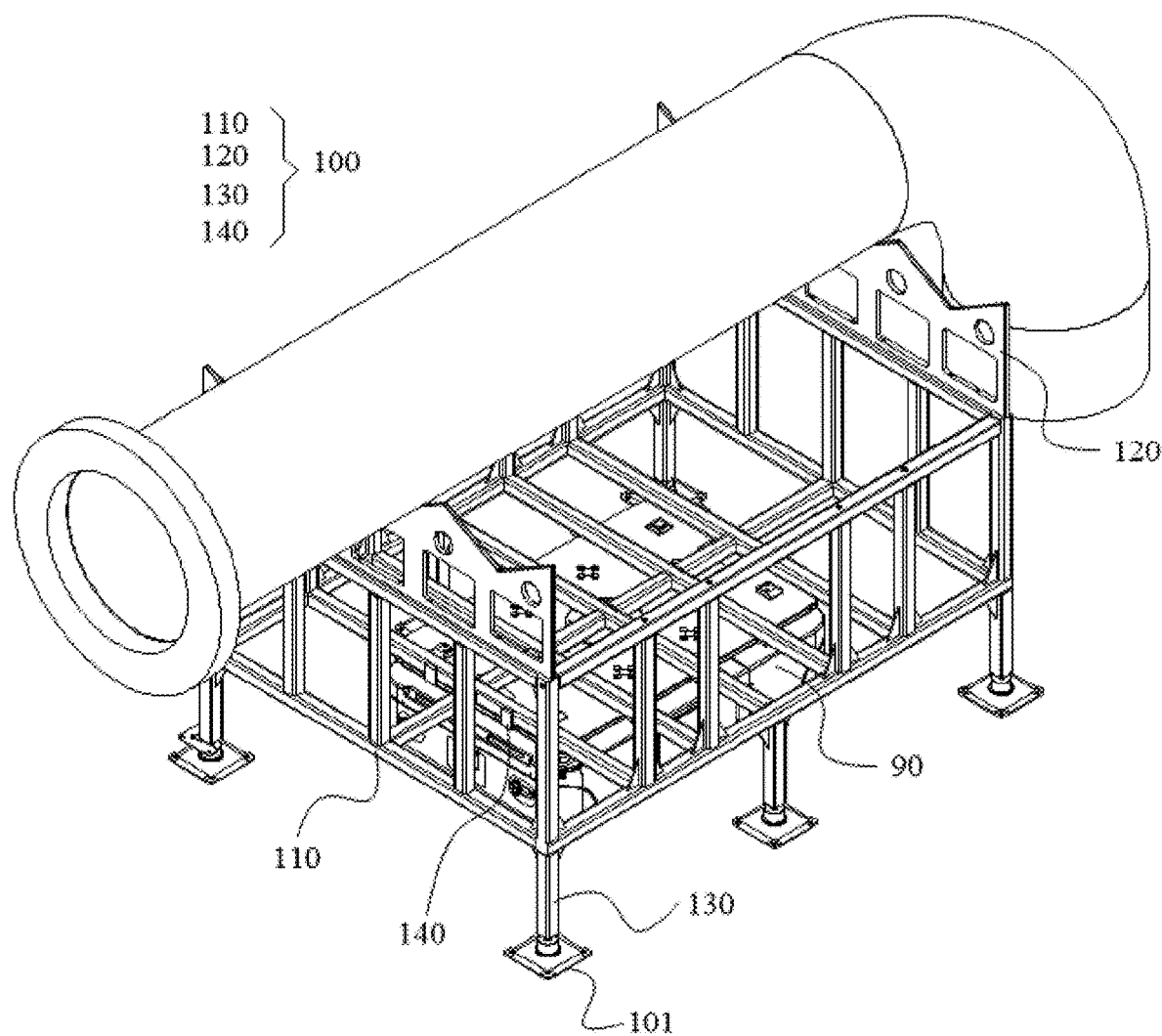
FIG. 12 is a schematic structural diagram of a second transfer module and a finished product storage module in FIG. 2 according to an example.

In this example, with reference to FIG. 12, the finished product storage module 100 may adopt the following structure. The finished product storage module 100 includes a material frame body 110 and a material holder 120. The material frame body 110 is configured as a rectangular frame structure and is provided with an opening at a top. Further, four side surfaces and a bottom surface of the material frame body 110 may be configured to have hollowed structures. The material holder 120 is fixedly arranged at the top of the material frame body 110. The top of the material holder 120 is configured as a serrated structure. An interior of the material frame body 110 is used for a pipe section with a smaller structure to be placed. The top of the material holder 120 is used for a larger pipe section to be placed. The outside of the material frame body 110 is provided with a transfer area. A transfer apparatus may transfer the material frame body 110 through the transfer area.

In this example, with reference to FIG. 12, a bottom of the material frame body 110 is provided with a plurality of first support legs 130. The plurality of first support legs 130 are fixedly arranged at the bottom of the material frame body 110 to suspend the bottom of the material frame body 110.

In this example, with reference to FIG. 12, the transfer area is arranged at the bottom of the material frame body 110. In this example, the transfer area is located at the bottom of the material frame body 110, such that the material frame body 110 can be applied to a common transfer tool such as a forklift or an automated guided vehicle (AGV). In addition, the forklift and the AGV are more flexible to use and occupy a small area. A plurality of limiting blocks 140 are fixedly arranged at the bottom of the material frame body 110. The plurality of the limiting blocks 140 define the transfer area. The limiting block 140 is fixedly arranged on the material frame body 110. Since the material frame body 110 adopts the hollowed structure, the limiting block 140 may be fixedly arranged on the material frame body 110 through welding.

The second transfer module 90 is configured to transfer the finished product storage module 100, so as to move the finished product storage module 100 to the preset position.

In this example, with reference to FIG. 12, the second transfer module 90 may adopt the following structure, and the second transfer module 90 is configured as the AGV or the forklift or the intelligent transfer robot.

In this example, the first transfer module 80 places the assembled pipe section into the finished product storage module 100. After a particular number of assembled pipe sections are placed in the finished product storage module 100, the finished product storage module 100 is transferred to the preset position by the second transfer module 90. The preset position is a painted place, a storage place, etc. In this example, the second transfer module 90 and the finished product storage module 100 are not specifically limited.

According to the technical solution of the disclosure, the first transfer module 80 is adopted to transfer the pipe section to be machined and the fitting, and attach the fitting to the pipe section to be machined. After the fitting is attached to the pipe section to be machined, the fitting and the pipe section to be machined are welded together by the welding module 50. Under the action of the first transfer module 80, manual transfer of fittings with the large structures such as flanges and elbow pipes is avoided, and manual attachment of the fitting to the pipe section to be machined is avoided. Difficulty of manual transfer is further reduced, the production efficiency of the pipe section is improved, and the technical problems in the prior art is solved.

In an example, with reference to FIG. 1, the intelligent machining line for pipe sections further includes a derusting station. The derusting station is arranged upstream of the cutting station. The derusting station includes a derusting module 200, a second material conveying module 300 and a third material conveying module 400.

The second material conveying module 300 is configured to convey a pipe section to be derusted to the derusting module 200.

In this example, the second material conveying module 300 is configured as a steel pipe translation assembly.

The derusting module 200 is configured to derust the pipe section to be derusted.

Figure 13:
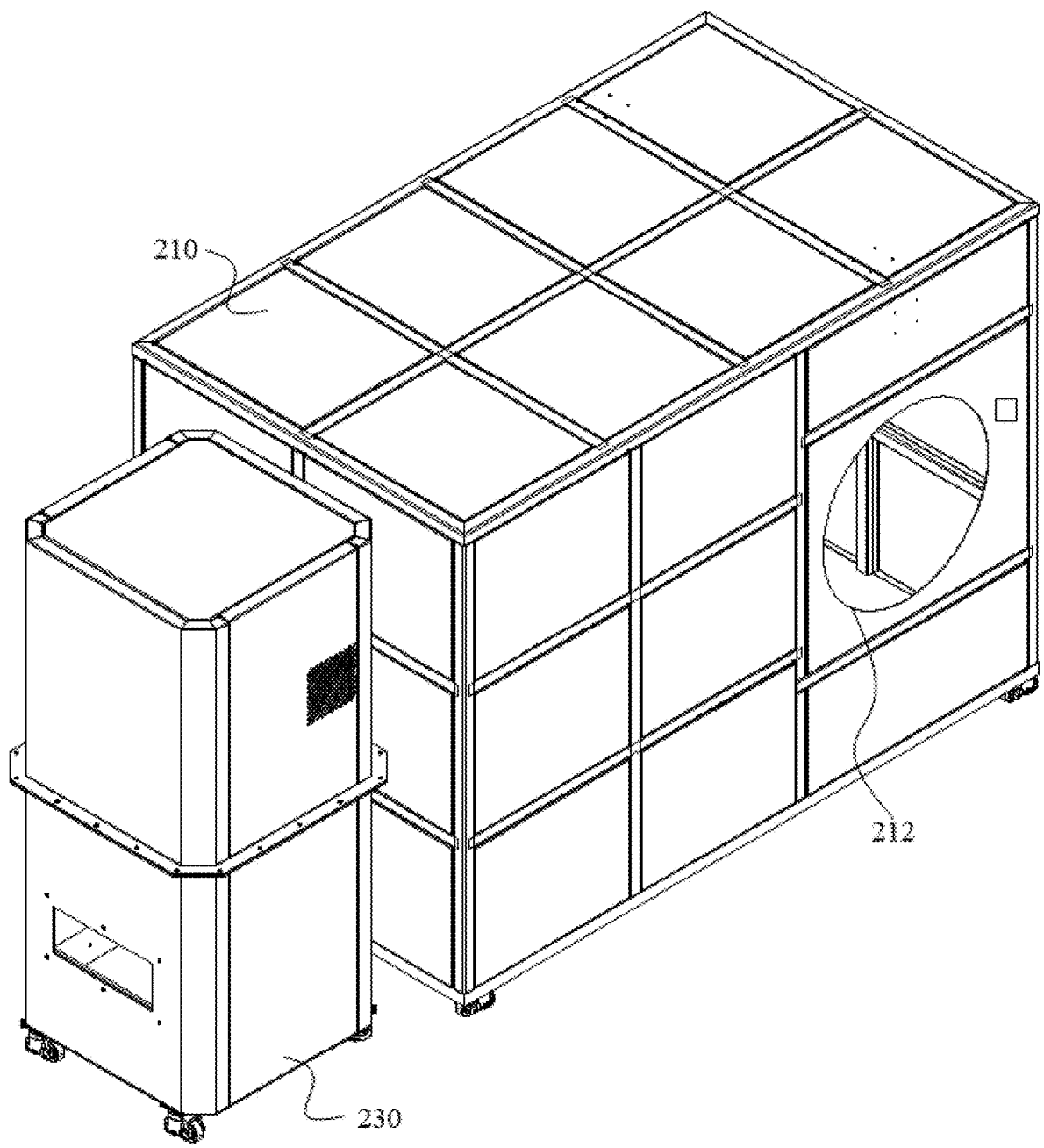
FIG. 13 is a schematic structural diagram of a derusting module in FIG. 1 from one perspective.
Figure 14:
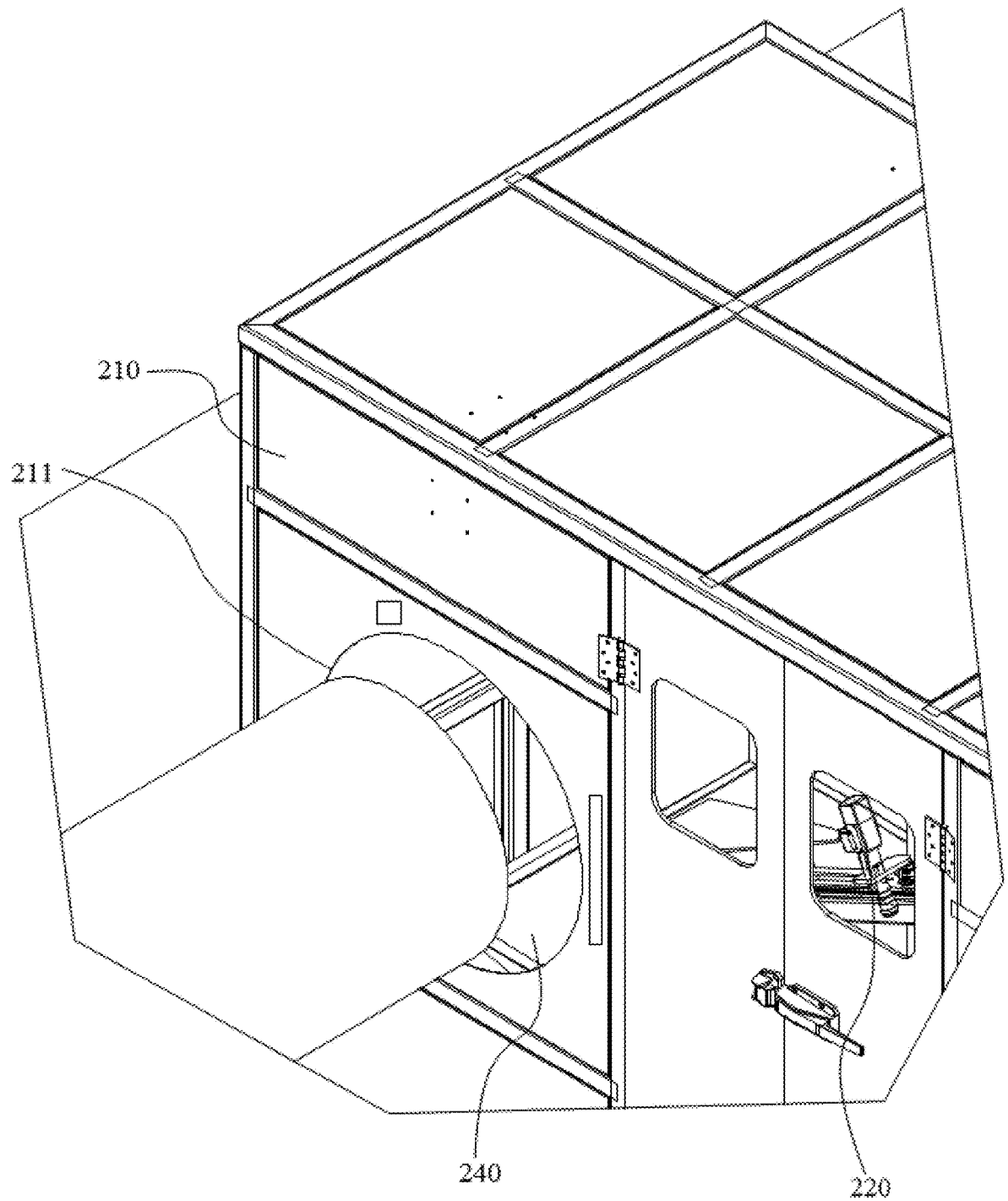
FIG. 14 is a schematic partial structural diagram of the derusting module in FIG. 1 from another perspective.

In this example, with reference to FIGS. 13 and 14, the derusting module 200 may adopt the following structure. The derusting module 200 includes a sixth machine frame 210, a laser emitter 220 and a controller. The sixth machine frame 210 is provided with a feeding opening 211 and a discharging opening 212. The sixth machine frame 210 is provided with a derusting position between the feeding opening 211 and the discharging opening 212. The feeding opening 211 and the discharging opening 212 are used for the pipe section to get in and out of the derusting position respectively. The laser emitter 220 is arranged at the sixth machine frame 210. An emitting end of the laser emitter 220 is arranged towards the derusting position. The controller is arranged at the sixth machine frame 210. The controller is electrically connected to the laser emitter 220. The controller is configured to control an output power of the laser emitter 220. In this example, the laser emitter 220 is arranged, and the laser emitter 220 emits laser towards the derusting position. When the pipe section needs to be derusted, the pipe section is sent into the sixth machine frame 210 from the feeding opening 211 at first, and the pipe section is controlled to pass through the derusting position. In this case, the laser emitted by the laser emitter 220 can quickly heat a rusting substance on the pipe section to a vaporized or molten state, such that the rusting substance is peeled off from a surface of the pipe section, and an efficient and thorough derusting effect is achieved. In this case, the pipe section continuously moves from the feeding opening 211 to the discharging opening 212, and continuously passes through the derusting position. The laser emitter 220 maintains the emitting end opposite the derusting position, and then the pipe section leaves the sixth machine frame 210 from the discharging opening 212. Thus, the surface of the pipe section is derusted. The output power of the laser emitter 220 is controlled by the controller for pipe sections with different specifications, such that energy carried by the laser can better adapt to a current rusting degree of pipe section, and a derusting effect is guaranteed. The sixth machine frame 210 includes a housing and a frame. The feeding opening 211 and the discharging opening 212 are provided in the housing. In addition, flexible baffles are arranged at positions of the feeding opening 211 and the discharging opening 212, so as to prevent the rusting substance at the derusting position from spilling into the surrounding environment.

In this example, the derusting module 200 further includes a tenth driving member. The tenth driving member is arranged at the sixth machine frame 210 and is electrically connected to the controller. The tenth driving member is in driving connection to the laser emitter 220, and is configured to adjust a space from the laser emitter 220 to the derusting position. The tenth driving member is configured as a motor linear driving module.

In this example, the derusting module 200 further includes a ranging sensor arranged at the laser emitter 220. The ranging sensor is electrically connected to the controller, and is configured to measure a distance from the laser emitter 220 to the derusting position. In this way, the user can accurately and timely adjust a position of the laser emitter 220 according to the space from the laser emitter 220 to the derusting position fed back by the ranging sensor, and guarantee that a length of the laser in an axial direction of the pipe section conforms to a diameter of a current pipe section. Thus, accuracy and reliability of laser derusting are improved, adjusting can be implemented to a most suitable position for derusting with minimum energy consumption, cost is reduced, and the derusting effect is further guaranteed.

In this example, the derusting module 200 further includes a cooling device. The cooling device is arranged at the sixth machine frame 210 and is configured to cool the laser emitter 220. It should be noted that the laser emitter 220 is likely to generate a large amount of heat when emitting the laser. In a process of derusting, the cooling device is started to cool the laser emitter 220. Thus, the laser emitter 220 is guaranteed at an appropriate temperature and influence of overheating on the derusting effect is avoided.

Specifically, the cooling device may be configured as a water cooling device or an air cooling device.

In this example, the derusting module 200 further includes a dust collector, a dust suction pipe section of the dust collector is arranged opposite the derusting position, and the dust collector is electrically connected to the controller. It should be noted that in the process of derusting, the laser vaporizes the rusting substance with heat, which inevitably produces dusty gas. In this way, the dust collector can suck this part of the gas away, and thus prevent the condition that the gas diffuses to the derusting environment, pollutes the derusted pipe section or endangers health of technicians.

In this example, with reference to FIG. 13, the derusting module 200 further includes a filter 230. The filter 230 is in communication with the dust collector. The filter 230 is electrically connected to the controller, and is configured to filter the air in a derusting apparatus. Thus, the filter 230 filters the vaporized rusting substance, so as to guarantee that the rusting substance satisfies emission standards before being emitted, satisfies requirements for environmental protection, and avoids endangering the health of the technicians. Specifically, when the laser emitter 220 is in a running state, the controller synchronously controls the dust collector and the filter 230 to run, so as to minimize a content of the vaporized rusting substance in the environment. The filter 230 includes an exhaust system and a filtering structure. The exhaust system is configured to promote a gas flow, so as to cause the gas in the environment to inevitably flow through a filtering structure. Thus, a purification effect is guaranteed.

In this example, with reference to FIG. 14, the derusting module 200 further includes a waste hopper 240. An inlet of the waste hopper 240 is provided upwards and located below the derusting position. The waste hopper 240 is in communication with the filter 230. It should be noted that besides the vaporized part, the rusting substance on the pipe section also peels off partially. The waste hopper 240 is arranged to collect the peeled rusting substance, cleanliness of the derusting environment is guaranteed, the technicians clean the derusting apparatus advantageously after the derusting operation is completed, and user experience is improved.

The third material conveying module 400 is configured to convey or store the derusted pipe section.

In this example, the third material conveying module 400 is configured as a steel pipe translation assembly.

In this example, the pipe section to be cut can be derusted before being cut through the derusting station. Thus, pollution of the pipe section to be cut in a cutting process can be reduced, rust flying can be avoided, and the working environment can be improved. In this example, the second material conveying module 300, the third material conveying module 400 and the derusting module 200 are not limited. A derusting method of the derusting module 200 may be laser derusting, physical derusting, chemical derusting, etc.

Figure 6:
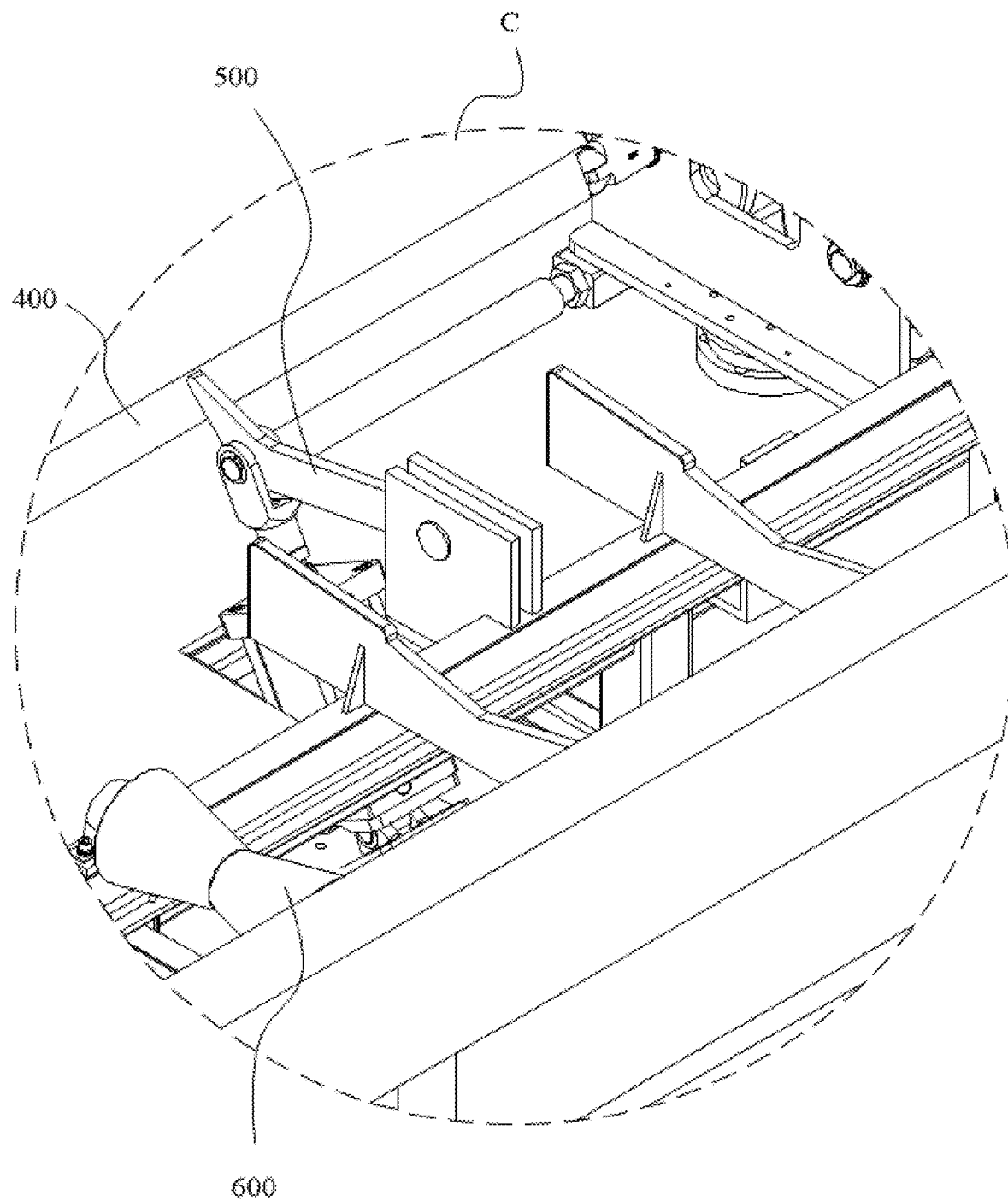
FIG. 6 is a partial enlarged view of portion C in FIG. 2.
Figure 11:
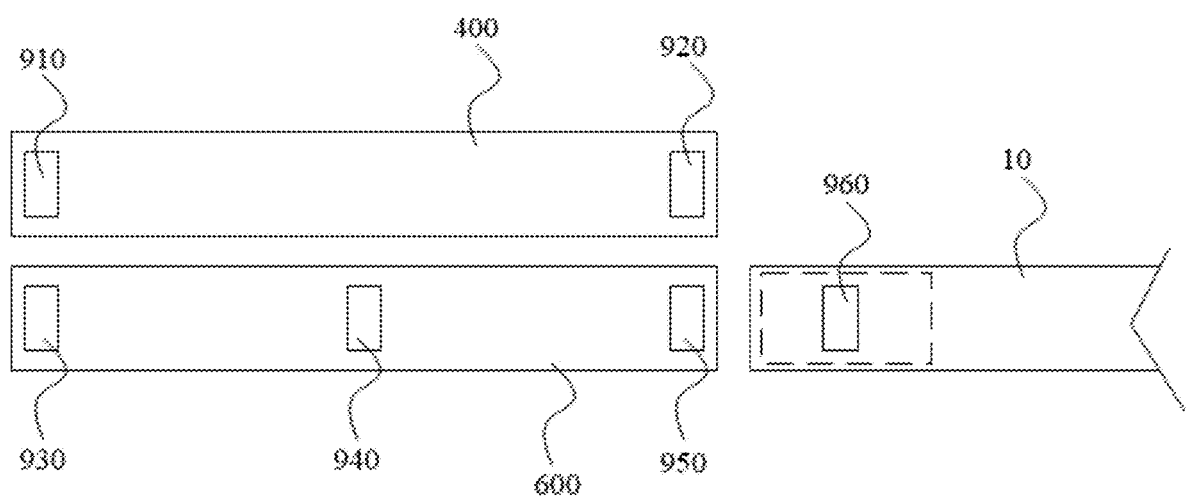
FIG. 11 is a schematic structural diagram of a first material conveying module, a third material conveying module and a fourth material conveying module in FIG. 1 according to the example.

In an example, with reference to FIGS. 6 and 11, the intelligent machining line for pipe sections further includes a temporary storage station. The temporary storage station is arranged between the derusting station and the cutting station. The temporary storage station includes a third transfer module 500 and a fourth material conveying module 600.

In this example, the third transfer module 500 is configured as a steel pipe transfer assembly.

The third transfer module 500 is mounted at the fourth material conveying module 600. The fourth material conveying module 600 is arranged corresponding to the first material conveying module 10, and is located at a side of the third material conveying module 400. The third transfer module 500 is configured to convey the pipe section on the third material conveying module 400 to the fourth material conveying module 600. The fourth material conveying module 600 is configured to convey the pipe section to the first material conveying module 10.

In this example, the fourth material conveying module 600 is configured as a steel pipe translation assembly. The fourth material conveying module 600 is arranged close to the third material conveying module 400, and is arranged parallel to the third material conveying module 400.

In this example, the pipe section derusted by the derusting module 200 enters the third material conveying module 400, and is conveyed on the third material conveying module 400. When conveyed to a position by the third material conveying module 400, the third transfer module 500 transfers the pipe section on the third material conveying module 400 to the fourth material conveying module 600, and then the fourth material conveying module 600 conveys the pipe section towards the first material conveying module 10, and conveys the pipe section into the cutting station.

Further, in an example, with reference to FIG. 11, one end of the third material conveying module 400 is provided with a first sensor 910, and the other end of the third material conveying module is provided with a second sensor 920. The first sensor 910 is arranged close to the derusting module 200. In this example, the first sensor 910 is configured to obtain incoming material information. When the pipe section derusted by the derusting module 200 enters the third material conveying module 400, the first sensor 910 may sense entry of the pipe section into the third material conveying module 400. In this case, the third material conveying module 400 starts to convey the pipe section. When one end of the pipe section corresponds to the second sensor 920 on the third material conveying module 400, the second sensor 920 feeds back to the third material conveying module 400, the third material conveying module 400 stops conveying the pipe section, and the pipe section is stored on the third material conveying module 400. In addition, when the pipe section is stored on the third material conveying module 400, the third material conveying module 400 also feeds back to the second material conveying module 300 and the derusting module 200, the second material conveying module 300 stops conveying the pipe section to the derusting module 200, and the derusting module 200 stops derusting. Alternatively, the second material conveying module 300 decreases a conveying speed and the derusting module 200 decreases a derusting speed. On the contrary, when the second sensor 920 does not sense existence of the pipe section on the third material conveying module 400 for a long time, and feeds back information to the second material conveying module 300 and the derusting module 200, the second material conveying module 300 increases the conveying speed and the derusting module 200 increases the derusting speed. A third sensor 930, a fourth sensor 940 and a fifth sensor 950 are uniformed arranged on the fourth material conveying module 600. In this example, the third sensor 930, the fourth sensor 940 and the fifth sensor 950 are arranged at two ends and a middle position of the fourth material conveying module 600 respectively. Thus, a state of the material left on the fourth conveying module 600 can be fully sensed, such that the third transfer module 500 transfers the pipe section on the third material conveying module 400 to the fourth material conveying module 600 advantageously.

Further, in this example, with reference to FIG. 11, a sixth sensor 960 is arranged at an end, close to the fourth material conveying module 600, of the first material conveying module 10. Thus, the fourth material conveying module 600 conveys the pipe section to be cut to the first material conveying module 10 in the cutting station. In this case, the sixth sensor 960 obtains first incoming material information and feeds such information back to the first material conveying module 10. In this case, the first material conveying module 10 drives the pipe section to move towards the clamping module 20 until the pipe section to be cut come into contact with the clamping module 20, then the pipe section to be cut is clamped by the clamping module 20, and then the pipe section to be cut is cut by the cutting module 30.

The feeding area is arranged on the first material conveying module 10. The first material conveying module 10 is configured to convey the cut pipe section to the feeding area. The sixth sensor 960 is located in the feeding area. The sixth sensor 960 is electrically connected to the first transfer module 80. That is to say, the feeding area is close to the fourth material conveying module 600. When the pipe section to be cut is divided into a plurality of pipe sections to be machined, the user may operate the first material conveying module 10 to convey the divided pipe sections to be machined to the feeding area one by one. Whenever one pipe section to be machined is conveyed to the feeding area, the sixth sensor 960 obtains second incoming material information and feeds the second incoming material information back to the first transfer module 80 in the assembly station. In this case, the first transfer module 80 arrives at the feeding area in the first material conveying module 10, and transfers the pipe section to be machined to the support module 40 in the assembly station.

In an example, the first transfer module 80 may also adopt the following structure. The first transfer module 80 further includes a truss platform 83.

In this example, with reference to FIG. 3, the driving structure is mounted at the truss platform 83. The grabbing assembly is mounted at the driving structure. The driving structure is configured to drive the grabbing assembly to move, so as to transfer the pipe section to be machined or the first fitting to the support module 40.

In this example, with reference to FIG. 3, the truss platform 83 may adopt the following structure. The truss platform 83 includes a seventh machine frame 831 having a rectangular ring structure and a plurality of second support legs 832. The plurality of second support legs 832 are fixedly arranged at preset positions. The preset position may be selected according to actual demand from the user. The seventh machine frame 831 is fixedly arranged on the plurality of second support legs 832. The seventh machine frame 831 and the plurality of second support legs 832 may be connected through welding or bolt locking.

In this example, with reference to FIG. 3, the driving structure may adopt the following structure. The driving structure includes a first driving assembly 811, a second driving assembly 812 and a third driving assembly 813.

In this example, with reference to FIG. 3, the first driving assembly 811 includes a movable beam 8111 and a first motor linear module 8112. The movable beam 8111 is slidably mounted at the seventh machine frame 831 through the first motor linear module 8112. In this example, the movable beam 8111 moves in the direction st3.

In this example, with reference to FIG. 3, the second driving assembly 812 includes a second movable seat 8121 and a second motor linear module 8122. In this example, the movable beam 8111 is configured as a rectangular beam, and the second movable seat 8121 is movably mounted at the movable beam 8111 through the second motor linear module 8122. In this example, the second movable seat 8121 moves in the direction st1.

In this example, with reference to FIG. 3, the third driving assembly 813 includes a second mounting frame 8131, a movable rod 8132, a quick release plate 8133, a guide member 8134 and a third motor linear module 8135. The second mounting frame 8131 is fixedly arranged at the second movable seat 8121 in the second driving assembly 812. The second mounting frame 8131 is fixedly arranged at the second movable seat 8121 through bolt locking. The movable rod 8132 is arranged at the second mounting frame 8131. The movable rod 8132 is configured as a rigid rod. The quick release plate 8133 is fixedly arranged at an end of the movable rod 8132, and is used for the grabbing assembly to be mounted. The guide member 8134 connects the second mounting frame 8131 to the movable rod 8132, such that the movable rod 8132 moves on the second mounting frame 8131. The second mounting frame 8131 may be configured as a cylindrical frame. The cylindrical frame may be a cylinder or a prism. The movable rod 8132 is movably mounted in the second mounting frame 8131 through the third motor linear module 8135, and the movable rod 8132 also moves in the direction st2. In this example, the quick release plate 8133 is fixedly arranged at an end, close to the ground, of the movable rod 8132 through bolt locking. The grabbing assembly is connected to the quick release plate 8133 through bolt locking. When the disclosure needs to replace different grabbing assemblies according to actual demand, the grabbing assembly may be separated from the quick release plate 8133.

In this example, with reference to FIG. 1, at least two driving structures are arranged, and each driving structure is connected to the grabbing assembly.

Figure 16:
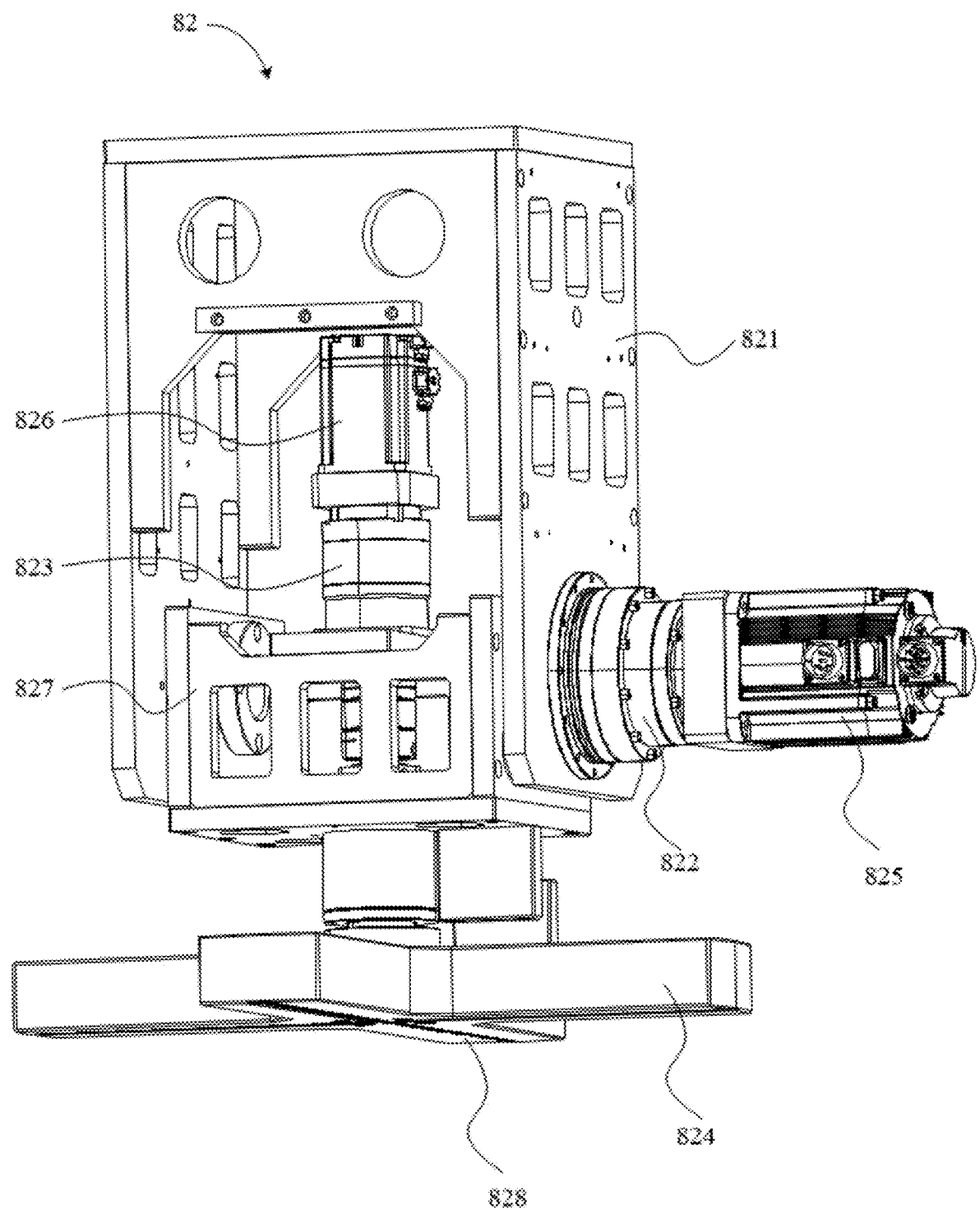
FIG. 16 is a schematic structural diagram of a first grabbing assembly in an intelligent machining line for pipe sections according to an example of the disclosure.

In this example, with reference to FIG. 16, the grabbing assembly may adopt the first grabbing assembly 82. The first grabbing assembly 82 has the following structure. The first grabbing assembly 82 includes a second mounting frame 821, a third rotary shaft 822, a fourth rotary shaft 823 and an adsorption portion 824.

In this example, the fourth rotary shaft 823 is rotatably connected to a connector 827, and is connected to the third rotary shaft 822 at an included angle through the connector 827. The third rotary shaft 822 is rotatably connected to the second mounting frame 821. The adsorption portion 824 is connected to the fourth rotary shaft 823. The adsorption portion 824 may rotate around rotation axes of the third rotary shaft 822 and the fourth rotary shaft 823. Specifically, the adsorption portion 824 rotates around the rotation axis of the fourth rotary shaft 823 and swings around the rotation axis of the third rotary shaft 822.

In this example, the first grabbing assembly 82 further includes a fifth driving motor 825 arranged on the second mounting frame 821 and a sixth driving motor 826 arranged on the connector 827. The fifth driving motor 825 is in driving connection to the third rotary shaft 822. The third rotary shaft 822 extends horizontally. The connector 827 is fixed to the third rotary shaft 822. The sixth driving motor 826 is in driving connection to the fourth rotary shaft 823. The fourth rotary shaft 823 extends vertically, and is rotatably connected to the connector 827.

In this example, the adsorption portion 824 is configured as an electromagnet. The adsorption portion 824 includes a plurality of support arms distributed in a circumferential direction. At a junction of the support arms, the adsorption portion 824 is connected to a rotary mechanism. A lower surface of the support arm is provided with a scale 828. The scale 828 extends in parallel to a corresponding support arm. Spaces between the same scale value of scales 828 and the junction of the plurality of support arms are equal. A lower end of the adsorption portion 824 is provided with a hook.

In an example, with reference to FIG. 3, the grabbing assembly may also adopt a second grabbing assembly 84. The second grabbing assembly 84 has the following structure. The second grabbing assembly 84 includes an eighth machine frame 841, two first clamping jaws 842 and a fourth driving assembly. In this example, the two oppositely arranged first clamping jaws 842 are slidably arranged on the eighth machine frame 841. The fourth driving assembly is fixedly arranged on the eighth machine frame 841. The fourth driving assembly is configured to make the two first clamping jaws 842 move close to or away from each other, such that the two first clamping jaws 842 clamp the pipe section.

In this example, with reference to FIGS. 2 and 3, two driving structures are arranged. The two driving structures are connected to the grabbing assembly. Thus, a use effect of the first transfer module 80 can be improved, the first transfer module 80 can transfer the pipe section and the fitting, use flexibility can be greatly improved, and difficulty of manual transfer can be effectively solved.

Figure 10:
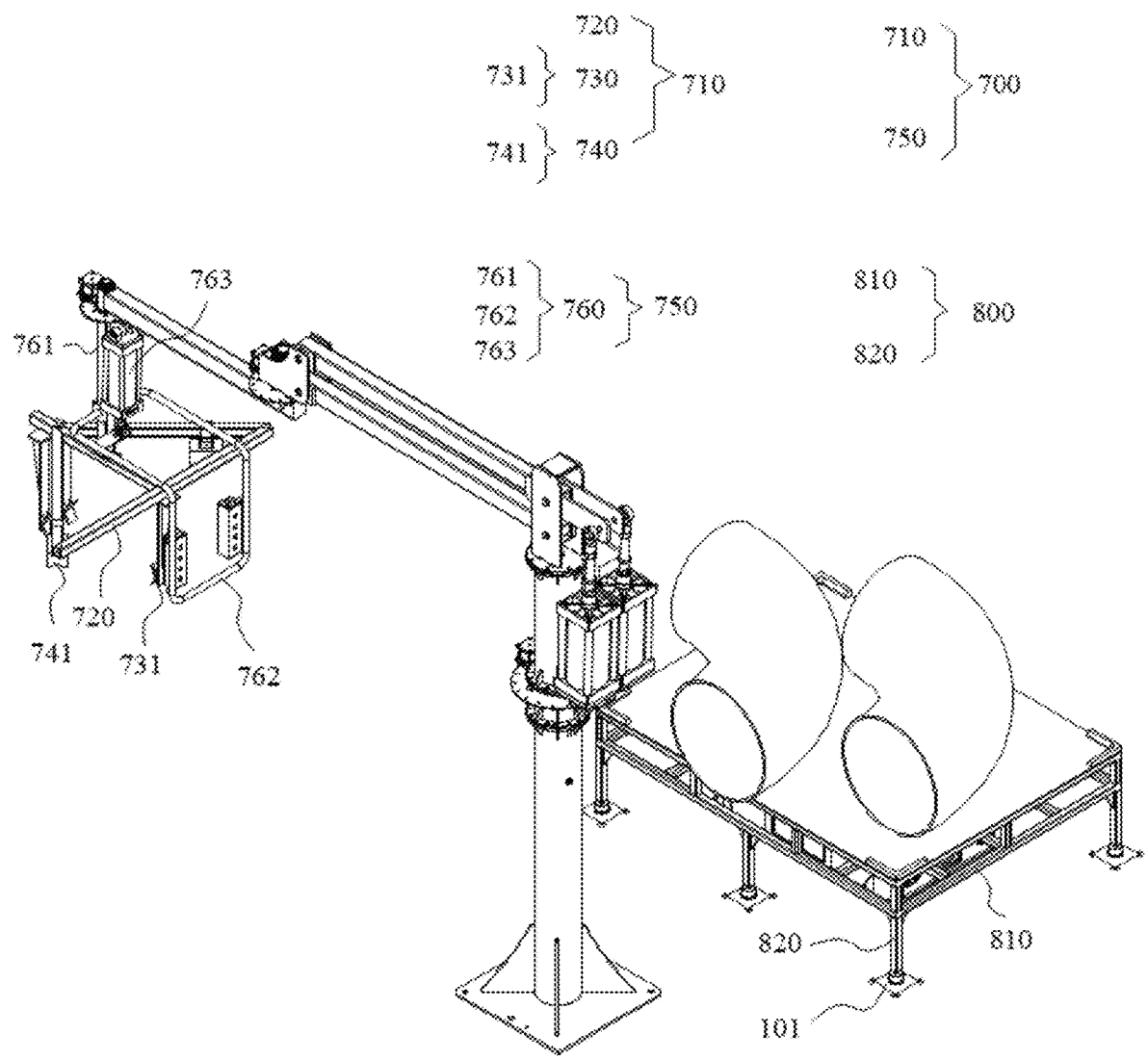
FIG. 10 is a schematic structural diagram of a power module and a second fitting storage module in FIG. 2 according to an example.

In an example, with reference to FIGS. 2 and 10, the assembly station further includes a power module 700 and a second fitting storage module 800. The power module 700 and the second fitting storage module 800 are both located outside the truss platform 83. The second fitting storage module 800 is configured to store a second fitting. The power module 700 is configured to transfer the second fitting to the support module 40. The welding module 50 is configured to weld the second fitting to the pipe section to be machined.

In this example, with reference to FIG. 10, the power module 700 includes a mechanical arm 710 and a power device 750.

In this example, with reference to FIG. 10, the mechanical arm 710 may adopt the following structure. The mechanical arm 710 includes a third mounting frame 720, a third grabbing assembly 730 and a fourth grabbing assembly 740. The third mounting frame 720 is configured as a frame. A connection seat is fixedly arranged at the third mounting frame 720. The connection seat is connected to the power device 750. The third grabbing assembly 730 includes two second clamping jaws 731 and an eleventh driving member 732. The two second clamping jaws 731 are movably mounted at the third mounting frame 720. The eleventh driving member 732 is fixedly arranged at the third mounting frame 720. The eleventh driving member 732 is configured to drive the two second clamping jaws 731 to move close to or away from each other, such that the third grabbing assembly 730 clamps or unclamps materials. The fourth grabbing assembly 740 includes a magnetic attraction member 741. The magnetic attraction member 741 is mounted at the third mounting frame 720. The magnetic attraction member 741 is configured to make the fourth grabbing assembly 740 magnetically attract materials. A mounting pipe is fixedly arranged on the third mounting frame 720. The magnetic attraction member 741 is mounted at the mounting pipe.

In this example, with reference to FIG. 10, the power device 750 includes a power arm 760, and the power arm 760 includes a connection rod 761, an operation rod 762 and a twelfth driving member 763. The connection rod 761 is hinged to the connection seat in the mechanical arm 710. The twelfth driving member 763 is configured as a driving cylinder. The twelfth driving member 763 is mounted at an operation rod 762. A stretchable end of the twelfth driving member 763 is hinged to the connection seat. Thus, when the twelfth driving member 763 stretches, the mechanical arm 710 may be turned over through an angle around a hinged joint with the connection rod 761, and the mechanical arm 710 may be turned over by 90 degrees.

In an example, with reference to FIG. 10, the second fitting storage module 800 includes a storage table 810 and a third support leg 820. The third support leg 820 is fixedly arranged at a bottom of the storage table 810. The third support leg 820 is fixed to the storage table 810 through welding. The storage table 810 is used for the fittings such as the branch pipe, the elbow pipes and the flange to be placed.

Figure 18:
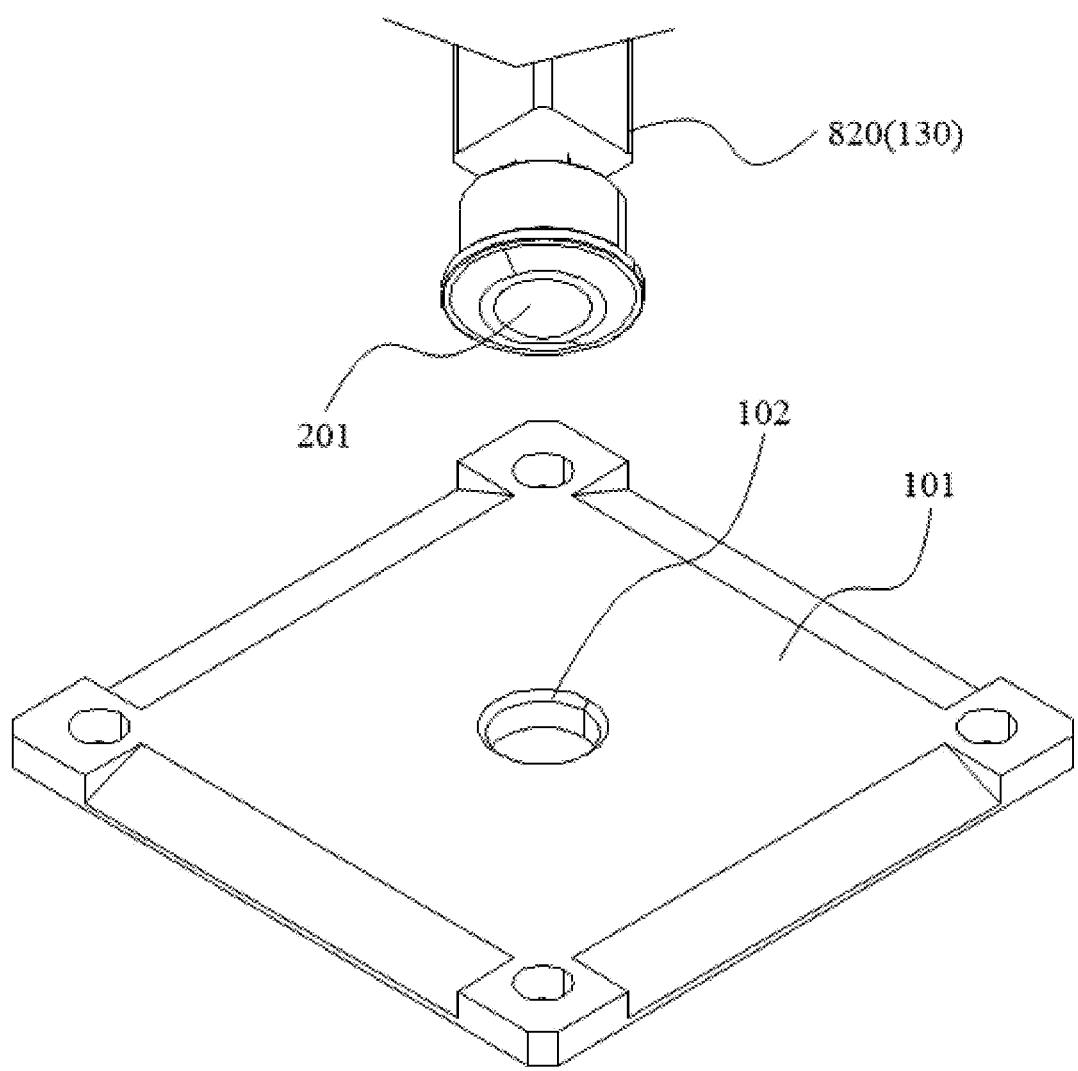
FIG. 18 is a schematic structural diagram of a positioning plate, a first support leg or a third support leg in 2 according to an example.

In an example, with reference to FIGS. 10 and 18, the intelligent machining line for pipe sections further includes a positioning plate 101 matching the plurality of first support legs 130 and the plurality of third support legs 820. In order to place the material frame body 110 and the storage table 810 at the preset position advantageously, the user may fix the positioning plate 101 to the preset position. Thus, in a subsequent use process, the storage table 810 and the material frame body 110 may be placed at the preset positions directly according to the positioning plate 101. Thus, the first transfer module 80 and the power module 700 can work advantageously.

In this example, with reference to FIG. 18, a top of the positioning plate 101 is provided with a recess 102. Balls 201 are embedded in bottoms of the first support leg 130 and the third support leg 820. When the ball 201 falls into the recess 102, the first support leg 130 or the third support leg 820 may be limited in the positioning plate 101 under the self-weight of the material frame body 110 or the storage table 810. Thus, the material frame body 110 and the storage table 810 may be positioned at the preset positions.

In this example, with reference to FIG. 10, a bottom of the storage table 810 is further provided with a transfer area. In the intelligent machining line for pipe sections, according to the preset positions of the material frame body 110 and the storage table 810, a route for the transfer apparatus may be planned, and the transfer apparatus transfers the material frame body 110 and the storage table 810 advantageously. In addition, when no fitting exists on the storage table 810, the storage table 810 may be replaced by the transfer apparatus, so as to supplement the fitting.

In an example, with reference to FIG. 1, two finished product stations are configured, one of the finished product stations is located inside the truss platform 83, and the other one of the finished product stations is located outside the truss platform 83. In this example, the two finished product stations are arranged in order that the production line transfers the pipe section advantageously, such that flow efficiency of the production line is improved. The finished product station outside the truss platform 83 may be used as a waiting station to replace the station inside the truss platform 83, so as to improve the flow efficiency of the production line.

In this example, with reference to FIGS. 1 and 2, for a first finished product station arranged inside the truss platform 83, in actual use, the material frame body 110 carrying the fittings may be transferred to the first finished product station by the transfer apparatus. Then the fittings in the material frame body 110 are taken out by the first transfer module 80 and placed in the plurality of first fitting storage modules 60 respectively, so as to supplement the fitting.

In an example, the intelligent machining line for pipe sections further includes a visual assembly (not shown). The visual assembly includes a plurality of cameras, the plurality of cameras are mounted on the truss platform 83, and the plurality of cameras are configured to acquire image information of the intelligent machining line for pipe sections.

In this example, the intelligent machining line for pipe sections is provided with a master control unit, and the visual assembly is connected to the master control unit. The image information acquired by the plurality of cameras is fed back to the master control unit, and working efficiency of modules in the intelligent machining line for pipe sections is controlled by the master control unit.

For example, after the camera acquires the situation that the pipe section to be machined on the support module 40 is finished, the master control unit may drive the first transfer module 80 to transfer the pipe section to be machined from the feeding area to the support module 40. When no fittings exist on the first fitting storage module 60, the fitting may be supplemented through the transfer apparatus.

The disclosure further provides a method for machining pipe sections. The method for machining pipe sections is applied to the intelligent machining line for pipe sections. Reference is made to the example for a specific structure of the intelligent machining line for pipe sections. Since the intelligent machining line for pipe sections adopts all technical solutions of all the examples described above, the intelligent machining line for pipe sections has at least all the beneficial effects brought by the technical solutions of the examples described above, and will not be repeated herein. The method for machining pipe sections includes:

S10, the pipe section is cut by the cutting module 30.

S20, the cut pipe section is transferred by the first transfer module 80 to the support module 40, and the cut pipe section is taken as a pipe section to be machined.

S30, the fitting required for finished product pipe section production is moved by the first transfer module 80 to a position outside the pipe section to be machined, and the fitting is made by the first transfer module to attach to and abut against the pipe section to be machined.

S40, the fitting is welded by the welding module 50 to the pipe section to be machined.

S50, welding of one fitting is completed, then, a second fitting required for the pipe section production is continuously transferred by the first transfer module 80, the second fitting is made by the first transfer module to attach to and abut against the pipe section to be machined, and the second fitting is welded by the welding module 50 to the pipe section to be machined until the pipe section is assembled.

S60, an assembled pipe section is moved by the first transfer module 80 to the finished product storage module 100.

S70, a particular number of assembled pipe sections are stored in the finished product storage module 100, and then the finished product storage module 100 is transferred by the second transfer module 90 to a preset position.

According to the technical solution of the disclosure, the fittings (an elbow pipe, a branch pipe and a flange, etc.) are transferred by the first transfer module 80, manual transfer is replaced by the first transfer module 80, and the fittings are attached to the pipe section to be machined. Thus, difficulty of a manual operation can be reduced, machining efficiency of the pipe section can be improved, and the technical problems in the prior art can be solved.

In an example, the method for machining pipe sections further includes S80. S80 is before S50, and S80 includes:

When one end of the pipe section to be machined is in contact with the clamping module 20, and the fitting needs to be fitted to the other end of the pipe section to be machined, the fittings on the second fitting storage module 800 may be transferred by the power module 700 to the placement table 74 or the placement frame 76 in the material placement assembly 70. In this case, a height of the placement table 74 and a height of the placement frame 76 are adjusted by the ninth driving member 72, so as to pre-align the fitting with the pipe section to be machined. Then, the first movable seat 71 is moved so as to cause the first movable seat 71 to get close to the end of the pipe section to be machined, and the fitting to abut against the end of the pipe section to be machined, and the welding module 50 welds the fitting to the pipe section to be machined in this case.

Under the action of S80, the production efficiency of the pipe section machining can be further improved, and manual work can be reduced.

In an example, the method for machining pipe sections further includes S90. S90 is before S10, and S90 includes:

The pipe section to be cut is derusted by a derusting module 200.

In this example, the derusting module 200 performs laser derusting, and the derusting module 200 may also perform grinding derusting, derusting agent derusting, etc. besides the laser derusting. The pipe section to be cut is derusted before being cut, rust on the surface can be removed, pollution in subsequent cutting and conveying can be reduced, the working environment can be improved, and a lot of rust in a subsequent operation area can be avoided.

What is claimed is:

1. An intelligent machining line for pipe sections, comprising:
    a cutting station,
    an assembly station,
    a finished product station,
    a derusting station,
    a temporary storage station, and
    sensors,
        wherein the cutting station comprises a first conveyor, a clamping module, and a cutting module,
            wherein the first conveyor comprises a machine frame and a roller mounted on the machine frame, the first conveyor is configured to convey and support a pipe section to be cut,
            the clamping module is configured to clamp the pipe section to be cut and drive the pipe section to be cut to rotate on the first conveyor, and
            the cutting module is configured to cut the pipe section to be cut, and the cutting module is slidably arranged at a side of the first conveyor and moves along an axial direction of the pipe section;
        the assembly station is arranged downstream of the cutting station and comprises a support module, a welding module, a first fitting storage module, and a first transfer module,
            wherein the support module is configured to support a pipe section to be machined, and is capable of clamping and driving the pipe section to be machined to rotate,
            the first fitting storage module is configured to store a first fitting, the first transfer module is configured to transfer the pipe section to be machined to the support module and attach the first fitting to the pipe section to be machined, the welding module is configured to weld the first fitting to the pipe section to be machined to obtain an assembled pipe section, and the first transfer module comprises a driving structure and a grabbing assembly, wherein the grabbing assembly is configured to grab the pipe section to be machined, the first fitting or the assembled pipe section, and the driving structure is configured to drive the grabbing assembly to move among the assembly station, the cutting station and the finished product station;

the finished product station is arranged downstream of the assembly station and comprises a second transfer module and a finished product storage module, wherein the finished product storage module is configured to store the assembled pipe section, and the second transfer module is configured to transfer the finished product storage module, so as to move the finished product storage module to a preset position;

the derusting station is arranged upstream of the cutting station and comprises a derusting module, a second conveyor, and a third conveyor, wherein the derusting module is configured to derust the pipe section to be derusted; and the temporary storage station is arranged between the derusting station and the cutting station and comprises a fourth conveyor, wherein the fourth conveyor is arranged corresponding to the first conveyor, and is located at a side of the third conveyor;

wherein the third conveyor is provided with a first sensor and a second sensor, and a third sensor, a fourth sensor and a fifth sensor are arranged on the fourth conveyor;

wherein an end of the first conveyor is provided with a sixth sensor;

wherein a feeding area is provided on the first conveyor, the first conveyor is configured to convey a cut pipe section to the feeding area, the sixth sensor is located in the feeding area, and the sixth sensor is electrically connected to the first transfer module;

wherein the first transfer module further comprises a truss platform, the driving structure is mounted at the truss platform, the grabbing assembly is mounted at the driving structure, and the driving structure is configured to drive the grabbing assembly to transfer the pipe section to be machined or the first fitting to the support module; and wherein the assembly station further comprises a power module and a second fitting storage module, wherein the power module and the second fitting storage module are both located outside the truss platform, the second fitting storage module is configured to store a second fitting, the power module is configured to transfer the second fitting to the support module, and the welding module is configured to weld the second fitting to the pipe section to be machined.

2. The intelligent machining line for pipe sections according to claim 1, wherein the finished product station comprises a first and a second finished product stations, one of the first and second finished product stations is located inside the truss platform, and the other one of the first and second finished product stations is located outside the truss platform.

3. The intelligent machining line for pipe sections according to claim 2, further comprising a visual assembly, wherein the visual assembly comprises a plurality of cameras, the plurality of cameras are mounted on the truss platform, and the plurality of cameras are configured to acquire image information of the intelligent machining line for pipe sections.

4. A method for machining pipe sections using the intelligent machining line for pipe sections according to claim 1, comprising:

cutting the pipe section by the cutting module to obtain a cut pipe section;

transferring the cut pipe section by the first transfer module, to the support module, with the cut pipe section serving as the pipe section to be machined;

moving the first fitting to a position outside the pipe section to be machined by the first transfer module, and making the fitting attach to and abut against the pipe section to be machined;

welding the first fitting to the pipe section to be machined by the welding module;

transferring the second fitting by the first transfer module, and making the second fitting attach to and abut against the pipe section to be machined, and welding the second fitting to the pipe section to be machined by the welding module to obtain an assembled pipe section;

moving the assembled pipe section to the finished product storage module by the first transfer module; and storing the assembled pipe section in the finished product storage module, and then transferring the finished product storage module to the preset position by the second transfer module.

5. An intelligent machining line for pipe sections, comprising:

a cutting station, wherein the cutting station comprises a first material conveying module, a clamping module, and a cutting module, wherein the first material conveying module is configured to convey and support a pipe section to be cut, the clamping module is configured to clamp the pipe section to be cut and drive the pipe section to be cut to rotate on the first material conveying module, and the cutting module is configured to cut the pipe section to be cut, and the cutting module is slidably arranged at a side of the first material conveying module, and moves along an axial direction of the pipe section;

an assembly station, wherein the assembly station is arranged downstream of the cutting station, and the assembly station comprises a support module, a welding module, a first fitting storage module, and a first transfer module, wherein the support module is configured to support a pipe section to be machined, and is capable of clamping and driving the pipe section to be machined to rotate, the first fitting storage module is configured to store a first fitting, the first transfer module is configured to transfer the pipe section to be machined to the support module and attach the first fitting to the pipe section to be machined, and the welding module is configured to weld the first fitting to the pipe section to be machined; and a finished product station, wherein the finished product station is arranged downstream of the assembly station, and the finished product station comprises a second transfer module and a finished product storage module, wherein the finished product storage module is configured to store an assembled pipe section, and the second transfer module is configured to transfer the finished product storage module, so as to move the finished product storage module to a preset position, wherein the first transfer module comprises a driving structure and a grabbing assembly, wherein the grabbing assembly is configured to grab the pipe section to be machined, the first fitting or the assembled pipe section, and the driving structure is configured to drive the grabbing assembly to move among the assembly station, the cutting station and the finished product station;

the intelligent machining line for pipe sections further comprises a derusting station, wherein the derusting station is arranged upstream of the cutting station, and the derusting station comprises a derusting module, wherein the derusting module is configured to derust the pipe section to be derusted;

the intelligent machining line for pipe sections further comprises a temporary storage station, wherein the temporary storage station is arranged between the derusting station and the cutting station;

an end of the first material conveying module is provided with a sensor;

a feeding area is provided on the first material conveying module, the first material conveying module is configured to convey a cut pipe section to the feeding area, the sensor is located in the feeding area, and the sensor is electrically connected to the first transfer module;

the first transfer module further comprises a truss platform, the driving structure is mounted at the truss platform, the grabbing assembly is mounted at the driving structure, and the driving structure is configured to drive the grabbing assembly to move, so as to transfer the pipe section to be machined or the first fitting to the support module; and the assembly station further comprises a power module and a second fitting storage module, wherein the power module and the second fitting storage module are both located outside the truss platform, the second fitting storage module is configured to store a second fitting, and the power module is configured to transfer the second fitting to the support module, and the welding module is configured to weld the second fitting to the pipe section to be machined.

* * * * *